US012499188B2

(12) United States Patent
Nitta et al.

(10) Patent No.: US 12,499,188 B2
(45) Date of Patent: Dec. 16, 2025

(54) INFORMATION PROCESSING APPARATUS, INFORMATION PROCESSING METHOD, AND STORAGE MEDIUM FOR TRACEABILITY INTEGRATION

(71) Applicant: TOYOTA JIDOSHA KABUSHIKI KAISHA, Toyota (JP)

(72) Inventors: Iwao Nitta, Nagoya (JP); Teruyoshi Fujiwara, Toyota (JP); Ryota Suzuki, Ikeda (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 81 days.

(21) Appl. No.: 18/581,697

(22) Filed: Feb. 20, 2024

(65) Prior Publication Data

US 2024/0303302 A1  Sep. 12, 2024

(30) Foreign Application Priority Data

Mar. 7, 2023 (JP) .............................. JP2023-034919

(51) Int. Cl.
 *G06F 21/16* (2013.01)
 *H04L 9/32* (2006.01)

(52) U.S. Cl.
 CPC ............ *G06F 21/16* (2013.01); *H04L 9/3263* (2013.01)

(58) Field of Classification Search
 CPC ........ G06F 21/16; G06F 21/602; G06F 21/62; H04L 9/3263
 See application file for complete search history.

(56) References Cited

U.S. PATENT DOCUMENTS

| | | | |
|---|---|---|---|
| 2002/0196685 A1* | 12/2002 | Topham | G06F 21/64 714/E11.119 |
| 2013/0268759 A1* | 10/2013 | Blankenbeckler | H04L 9/006 713/168 |
| 2014/0201526 A1* | 7/2014 | Burgess | G06F 21/316 713/165 |
| 2023/0146229 A1* | 5/2023 | Igarashi | H04L 9/50 713/153 |

FOREIGN PATENT DOCUMENTS

JP        2004-171146 A      6/2004

\* cited by examiner

*Primary Examiner* — Michael Won
(74) *Attorney, Agent, or Firm* — Sughrue Mion, PLLC

(57) ABSTRACT

A control unit of an information processing apparatus acquires product information of each of one or more inclusion products included in a target product based on association information indicating an association relationship of products of companies included in a supply chain. The product information includes traceability-related information of the at one or more inclusion products. The traceability-related information is encrypted with a public key of a certificate authority. The control unit acquires an encrypted integrated result of the traceability-related information by computing the encrypted traceability-related information through secure computation. The control unit decodes the encrypted integrated result of the traceability-related information through the certificate authority.

20 Claims, 16 Drawing Sheets

FIG. 8

| COMPANY ID | | C001 |
|---|---|---|
| COMPANY NAME | | COMPANY A |
| PRODUCT ID | | P001 |
| PRODUCT NAME | | PRODUCT A |
| ASSOCIATION-RELATED INFORMATION | UPSTREAM PRODUCT INFORMATION | (NOT ASSOCIATED) |
| | TERMINATION FLAG | (NOT SET) |
| TRACEABILITY-RELATED INFORMATION | AMOUNT OF USE OF MATERIAL (LITHIUM) | ***** |
| | AMOUNT OF USE OF MATERIAL (NICKEL) | ***** |
| | AMOUNT OF USE OF MATERIAL (COBALT) | ***** |
| | AMOUNT OF USE OF MATERIAL (LEAD) | ***** |
| | AMOUNT OF USE OF UPSTREAM PRODUCTS | ***** |
| | OWN COMPANY MEASURED CFP VALUE | ***** |
| | DD INFORMATION | *** |
| --- | --- | --- |

ENCRYPTED WITH PUBLIC KEY OF CERTIFICATE AUTHORITY (applies to TRACEABILITY-RELATED INFORMATION rows)

FIG. 9

REGISTER PRODUCT / SET DISCLOSURE DESTINATION

PRODUCT PART NUMBER: P0001

SET PERMITTED COMPANY:
- ☐ A CORPORATION
- ☐ B CORPORATION
- ☑ C CORPORATION
- ☐ D CORPORATION
- ☐ E CORPORATION
- ☐ F CORPORATION

PERMITTED ITEM:
- ☑ COMPANY NAME
- ☑ OWN COMPANY'S PART NUMBER
- ☑ PARTNER'S PART NUMBER
- ☑ FOR REQUIRED
- ☑ EMISSION FACTOR
- ☑ ***

FIG. 10

PERMISSION INFORMATION GENERATED BY COMPANY TERMINAL

| COMPANY ID | C001 |
|---|---|
| PRODUCT ID | P001 |
| COMPANY ID PERMITTED TO ACCESS | *** |
| ITEM NAME PERMITTED TO ACCESS | *** |

FIG. 11

REGISTER PRODUCT / SET ASSOCIATION DESTINATION

PRODUCT PART NUMBER: P00001

UPSTREAM COMPANY:
- ☐ A CORPORATION
- ☐ B CORPORATION
- ☑ C CORPORATION
- ☐ D CORPORATION
- ☐ E CORPORATION
- ☐ F CORPORATION

UPSTREAM PRODUCT:
- ☑ P10001
- ☑ P10002
- ☑ P10003
- ☑ P10004
- ☑ P10005
- ☑ ***

☐ THIS PRODUCT IS TERMINATION OF TREE (NO ASSOCIATION DESTINATION) — 1001

☐ ASSOCIATION DOES NOT OCCUR ANY MORE — 1002

INFORMATION PROCESSING APPARATUS, INFORMATION PROCESSING METHOD, AND STORAGE MEDIUM FOR TRACEABILITY INTEGRATION

CROSS-REFERENCE TO RELATED APPLICATION

This application claims priority to Japanese Patent Application No. 2023-034919 filed on Mar. 7, 2023, incorporated herein by reference in its entirety.

BACKGROUND

1. Technical Field

The disclosure relates to an information processing apparatus, an information processing method, and a storage medium.

2. Description of Related Art

There is known a system with which information is shared among a plurality of companies that make up a supply chain. In this respect, for example, Japanese Unexamined Patent Application Publication No. 2004-171146 (JP 2004-171146 A) describes a system with which product information is shared between adjacent suppliers.

SUMMARY

The disclosure provides a technology for making it possible to collect information on traceability over the entire supply chain while ensuring confidentiality.

An aspect of the disclosure provides an information processing apparatus. The information processing apparatus includes a control unit. The control unit is configured to execute: acquiring association information indicating an association relationship of products of companies included in a supply chain; acquiring product information of each of one or more inclusion products included in a target product based on the association information, the product information including traceability-related information of each of the one or more inclusion products, the traceability-related information being encrypted with a public key of a certificate authority; acquiring an encrypted integrated result of the traceability-related information by computing the encrypted traceability-related information through secure computation; sending, to the certificate authority, a request to decode the encrypted integrated result of the traceability-related information; and receiving, from the certificate authority, the decoded integrated result of the traceability-related information.

Another aspect of the disclosure provides an information processing method that is executed by a computer. The information processing method includes: acquiring association information indicating an association relationship of products of companies included in a supply chain; acquiring product information of each of one or more inclusion products included in a target product based on the association information, the product information including traceability-related information of each of the one or more inclusion products, the traceability-related information being encrypted with a public key of a certificate authority; acquiring an encrypted integrated result of the traceability-related information by computing the encrypted traceability-related information through secure computation; sending, to the certificate authority, a request to decode the encrypted integrated result of the traceability-related information; and receiving, from the certificate authority, the decoded integrated result of the traceability-related information.

Further another aspect of the disclosure provides a storage medium storing instructions that are executable on one or more processors to execute functions. The functions include: acquiring association information indicating an association relationship of products of companies included in a supply chain; acquiring product information of each of one or more inclusion products included in a target product based on the association information, the product information including traceability-related information of each of the one or more inclusion products, the traceability-related information being encrypted with a public key of a certificate authority; acquiring an encrypted integrated result of the traceability-related information by computing the encrypted traceability-related information through secure computation; sending, to the certificate authority, a request to decode the encrypted integrated result of the traceability-related information; and receiving, from the certificate authority, the decoded integrated result of the traceability-related information.

Yet another aspect of the disclosure may be a storage medium storing the above program in a non-transitory manner.

According to the disclosure, it is possible to provide a technology for making it possible to collect information on traceability over the entire supply chain while ensuring confidentiality.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is an example of product information generated by a product information generating unit;

FIG. 9 is an example of a user interface output by an authority setting unit;

FIG. 10 is an example of permission information generated by the authority setting unit based on information input;

FIG. 11 is an example of a user interface containing a list of products that are candidates to be associated;

DETAILED DESCRIPTION OF EMBODIMENTS

Figure 1:
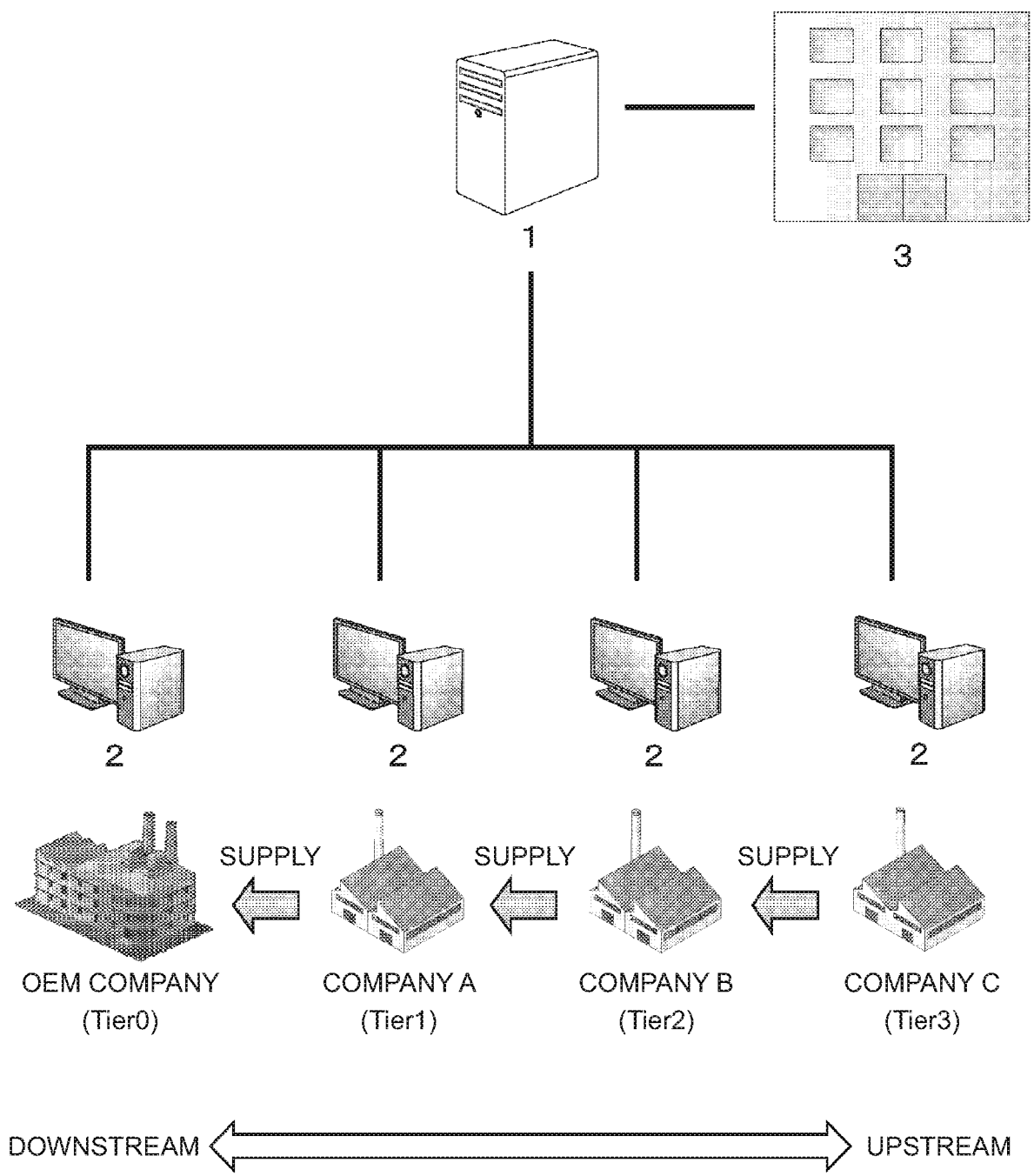
FIG. 1 is a diagram that illustrates an example of a supply chain according to an embodiment.

Carbon footprint (Carbon Footprint of Products (CFP)) is a mechanism for converting the amount of emission of greenhouse effect gas emitted through the entire life cycle from raw material procurement of products to disposal and recycling to $CO_2$ emission amount and indicating the $CO_2$ emission amount on the products. To implement CFP, traceability in which suppliers involved from raw material procurement of products to disposal and recycling are recorded and a history is placed in a traceable state is important.

Here, the inventors of the subject application found the following inconvenience on the existing system. To ensure traceability of information, such as CFP, it is desired to collect the information not only between adjacent companies but also over the entire supply chain. However, with the existing system, information can be shared only between adjacent companies. In addition, the information includes confidential information (for example, CFP values of inclusion products, the amount of use of inclusion products, and the like) of upstream company products, so it is not favorable to disclose the information to the entire supply chain. In other words, there has been an inconvenience that it is difficult to collect information on traceability over the entire supply chain while ensuring confidentiality.

The above inconvenience occurs not only in a scene to collect CFP. The inconvenience can arise in, for example, every scene to collect selected information on products, such as other traceability-related information (for example, a raw material recycling rate, due diligence information, or the like) and information on the other products (for example, constituent elements, identification information, and the like).

An aspect of the disclosure provides an information processing apparatus. The information processing apparatus includes a control unit. The control unit is configured to execute: acquiring association information indicating an association relationship of products of companies included in a supply chain; acquiring product information of each of one or more inclusion products included in a target product based on the association information, the product information including traceability-related information of each of the one or more inclusion products, the traceability-related information being encrypted with a public key of a certificate authority; acquiring an encrypted integrated result of the traceability-related information by computing the encrypted traceability-related information through secure computation; sending, to the certificate authority, a request to decode the encrypted integrated result of the traceability-related information; and receiving, from the certificate authority, the decoded integrated result of the traceability-related information.

The information processing apparatus according to the disclosure may be a server that manages pieces of product information of the companies included in the supply chain or may be a terminal of one of the companies included in the supply chain. In the thus configured information processing apparatus, the control unit acquires association information indicating an association relationship of products of companies included in a supply chain. The association information is information that associates pieces of product information. In an example, the association information may be information that associates product information of a target product with product information of an inclusion product. An inclusion product is a product included in a target product and used in a process of manufacturing the target product.

The control unit acquires product information of each of one or more inclusion products included in a target product based on the acquired association information. The product information according to the present disclosure includes information obtained by encrypting traceability-related information of an inclusion product with a public key of a certificate authority. Traceability-related information is information required to ensure traceability. In an example, the traceability-related information may be information for calculating an amount of emission of greenhouse effect gas, a recycling rate of raw material, a score for due diligence, or the like.

The control unit acquires an encrypted integrated result of the traceability-related information by computing the encrypted traceability-related information through secure computation. In an example, secure computation may be performed by fully homomorphic encryption. Secure computation may be performed by a combination of addition homomorphic encryption and multiplication homomorphic encryption. A secure computation method can be changed as needed according to an embodiment.

The control unit sends, to the certificate authority, a request to decode the encrypted integrated result of the traceability-related information. In this case, in the certificate authority, the encrypted integrated result of the traceability-related information is decoded with a secret key corresponding to the public key. The certificate authority sends the decoded integrated result of the traceability-related information to the information processing apparatus. Thus, the control unit of the information processing apparatus can receive the decoded integrated result of the traceability-related information.

According to the present disclosure, the traceability-related information included in the product information can be encrypted with the public key of the certificate authority in advance. The pieces of encrypted traceability-related information can be integrated through secure computation. The encrypted integrated result of the traceability-related information is decoded by the certificate authority and is provided to the information processing apparatus. Thus, it is possible to collect information on traceability over the entire supply chain while ensuring the confidentiality of the traceability-related information of a product of each of the companies included in the supply chain.

The decoded integrated result of the traceability-related information may be sent from the certificate authority to the information processing apparatus in an encrypted state that the control unit of the information processing apparatus is allowed to decode. An encrypted state that the control unit is allowed to decode is to convert from a state decodable by only the certificate authority to a state decodable also by the information processing apparatus. In an example, the integrated result may be decoded with a key (for example, a secret key) held by the certificate authority, and then may be encrypted with a key accessible by the information processing apparatus (for example, a key shared between the information processing apparatus and the certificate authority). Thus, it is possible to reduce a situation that the decoded integrated result of the traceability-related information is identified by a third party.

Traceability-related information may include the amount of emission of greenhouse effect gas. In this case, the control unit can acquire the total amount of emission of greenhouse effect gas relevant to a production activity until a target product is manufactured, as the decoded integrated result of the traceability-related information.

Traceability-related information may include a recycling rate of a predetermined raw material. In this case, the control unit can acquire a comprehensive recycling rate of a predetermined raw material in a target product, as the decoded integrated result of the traceability-related information.

The traceability-related information may include a score for due diligence. In this case, the control unit can acquire a comprehensive score for due diligence in a target product, as the decoded integrated result of the traceability-related information.

Here, the target product may be a battery. In this case, the inclusion product may be a product used at the time of manufacturing a battery. With this configuration, it is possible to ensure traceability on a battery.

Hereinafter, a specific embodiment of the disclosure will be described with reference to the accompanying drawings. The hardware configuration, module configuration, functional configuration, and the like described in the embodiment do not intend to limit the technical scope of the disclosure to them unless otherwise specified.

Embodiment

An information processing system according to the present embodiment is a system that provides information on products supplied by a supply chain including a plurality of companies. Information on products is typically information on traceability. Companies that belong to a supply chain may be determined as needed according to the attribute of a product or the like.

Initially, the structure of a supply chain will be described. FIG. 1 is a diagram that illustrates an example of the supply chain according to the present embodiment. The supply chain shown in FIG. 1 is made up of an OEM company and a plurality of companies that are suppliers. In the example of FIG. 1, it is assumed that the supply chain manufactures, for example, automobiles themselves, and products relevant to automobiles, such as batteries. The OEM company is a company that provides end products assembled. The companies (Company A, Company B, and Company C) that are suppliers supply parts, materials, assemblies, and the like for manufacturing end products. The companies that are suppliers each manufacture one or more products and supply the products to companies at a level lower by one. A plurality of companies repeats this flow, and end products are obtained in the last process (that is, the OEM company).

In the present embodiment, a side that supplies products at levels of the supply chain is referred to as an upstream side, and a side that purchases the products and manufactures new products is referred to as a downstream side. In the specification, a company positioned at the upstream side is referred to as an upstream company, and a company positioned at the downstream side is referred to as a downstream company. Products manufactured by an upstream company are referred to as upstream products, and products manufactured by a downstream company are referred to as downstream products. Downstream products include upstream products (that is, upstream products are used in a process of manufacturing downstream products). In the present embodiment, levels in the supply chain are referred to as Tiers. Tier0 is the lowest level that provides end products assembled (that corresponds to the OEM company), and, as the level advances in order of Tier1, Tier2, and Tier3, the level shifts toward the upstream side. Depending on a level focused, a downstream company may be changed to an upstream company. For example, Company B in Tier2 is a downstream company in relation to Tier3 but is an upstream company in relation to Tier1. In this way, the definition of upstream company and downstream company can change level by level.

Figure 2:
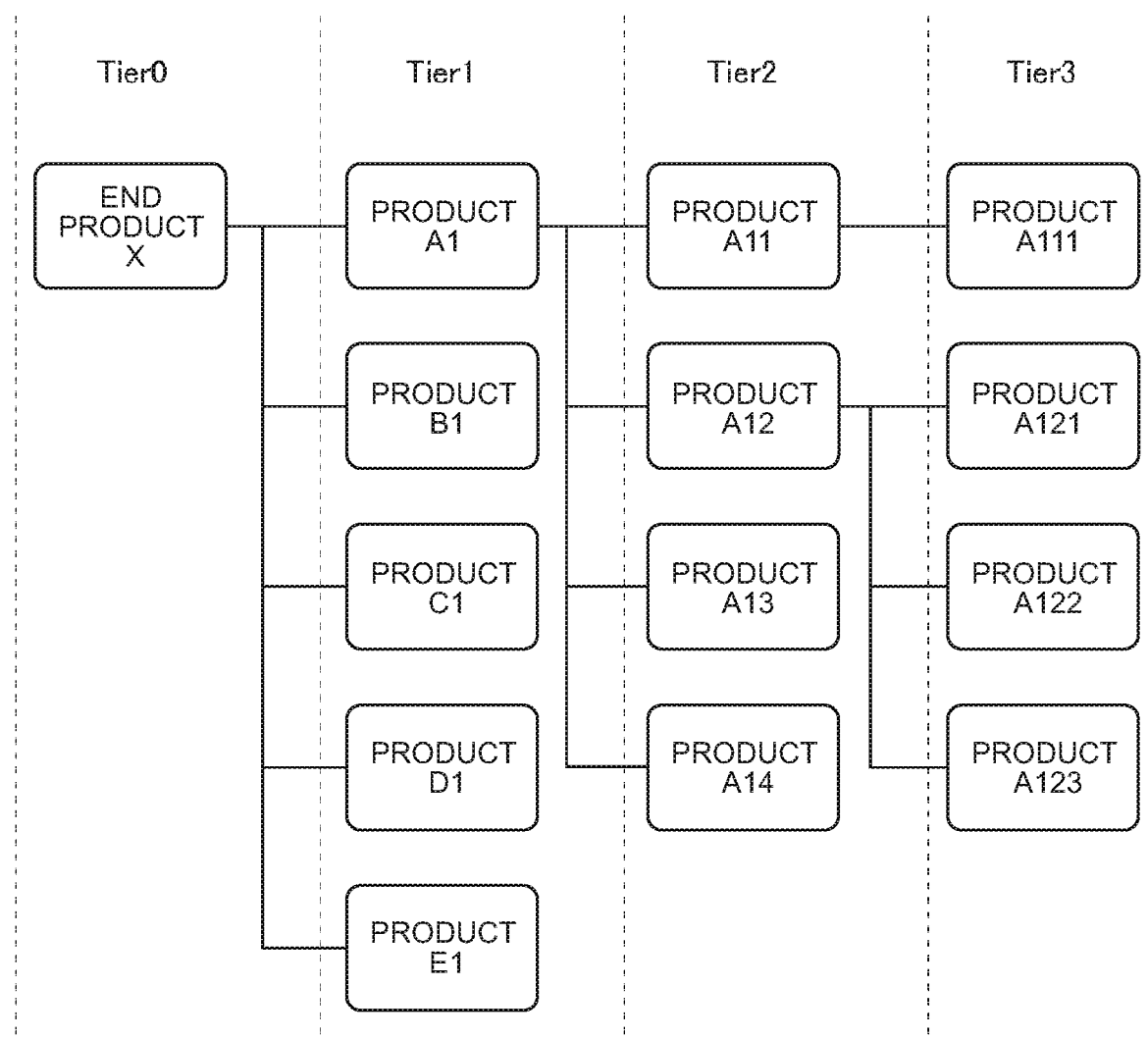
FIG. 2 is a diagram that illustrates an example of a relationship among products supplied by the supply chain.

FIG. 2 is a diagram that illustrates an example of a relationship among products supplied by a supply chain. Here, a supply relationship of a plurality of products that make up an end product X is represented by a tree diagram. In this example, the end product X is manufactured by assembling products A1, B1, C1, D1, . . . The product A1 is manufactured by assembling products A11, A12, A13, . . . In this way, a relationship among a plurality of products that make up an end product can be represented by a tree diagram with individual products as nodes. Hereinafter, a tree diagram on a specific end product is referred to as a product tree.

A server apparatus 1 according to the present embodiment collects information on products manufactured by companies (hereinafter, product information) and information for associating pieces of product information from terminals corresponding to companies (company terminals 2) and generates a product tree based on these pieces of information. Product information includes traceability-related information (for example, information on the amount of emission of greenhouse effect gas). It is possible to trace carbon footprint or the like by tracking a product tree.

In the present embodiment, the traceability-related information included in the product information is encrypted with the public key of a certificate authority 3 (hereinafter, which may be referred to as "public key A"). The server apparatus 1 integrates the pieces of encrypted traceability-related information through secure computation. The server apparatus 1 makes a request of the certificate authority 3 to decode the encrypted integrated result of the traceability-related information.

The certificate authority 3 decodes the encrypted integrated result of the traceability-related information with a secret key corresponding to the public key A used to encrypt traceability-related information (hereinafter, which may be referred to as "secret key A"). The certificate authority 3 encrypts the decoded integrated result of the pieces of traceability-related information with a method with which the server apparatus 1 is allowed to decode the information and provides the encrypted integrated result to the server apparatus 1. The certificate authority 3 is, for example, a trusted third party that executes information processing on authentication, such as issuance of electronic certificates for companies.

Encrypting information with a method with which the server apparatus 1 is allowed to decode the information is to convert from a state decodable by only the certificate authority 3 to a state decodable also by the server apparatus 1. In an example, the integrated result decoded with the secret key A held by the certificate authority 3 may be encrypted with a public key (hereinafter, which may also be referred to as "public key B") corresponding to a secret key (hereinafter, which may also be referred to as "secret key B") held by the server apparatus 1.

The server apparatus 1 decodes the encrypted integrated result provided from the certificate authority 3, with the secret key B held by the server apparatus 1. The server apparatus 1 outputs the integrated result decoded with the secret key B. Outputting the decoded integrated result may include a process of providing the company terminal 2 of an OEM company with the integrated result decoded with the secret key B.

As shown in FIG. 1, the information processing system according to the present embodiment includes the server apparatus 1 and the company terminals 2.

The company terminals 2 are terminals respectively corresponding to the companies that make up the supply chain. The number of terminals corresponding to each company may be selected. Terminals corresponding to a target company may include a terminal of a company that performs an operation on the target company (for example, a substitute company).

The server apparatus 1 collects information for generating a product tree from each of the company terminals 2 and generates a product tree based on these pieces of information collected. Furthermore, the server apparatus 1 is capable of executing a process on traceability (typically, a process of calculating the amount of emission of carbon dioxide ($CO_2$), or the like) based on the product tree generated. The server apparatus 1 is also capable of sending the execution result of the process to the company terminals 2.

Figure 3:
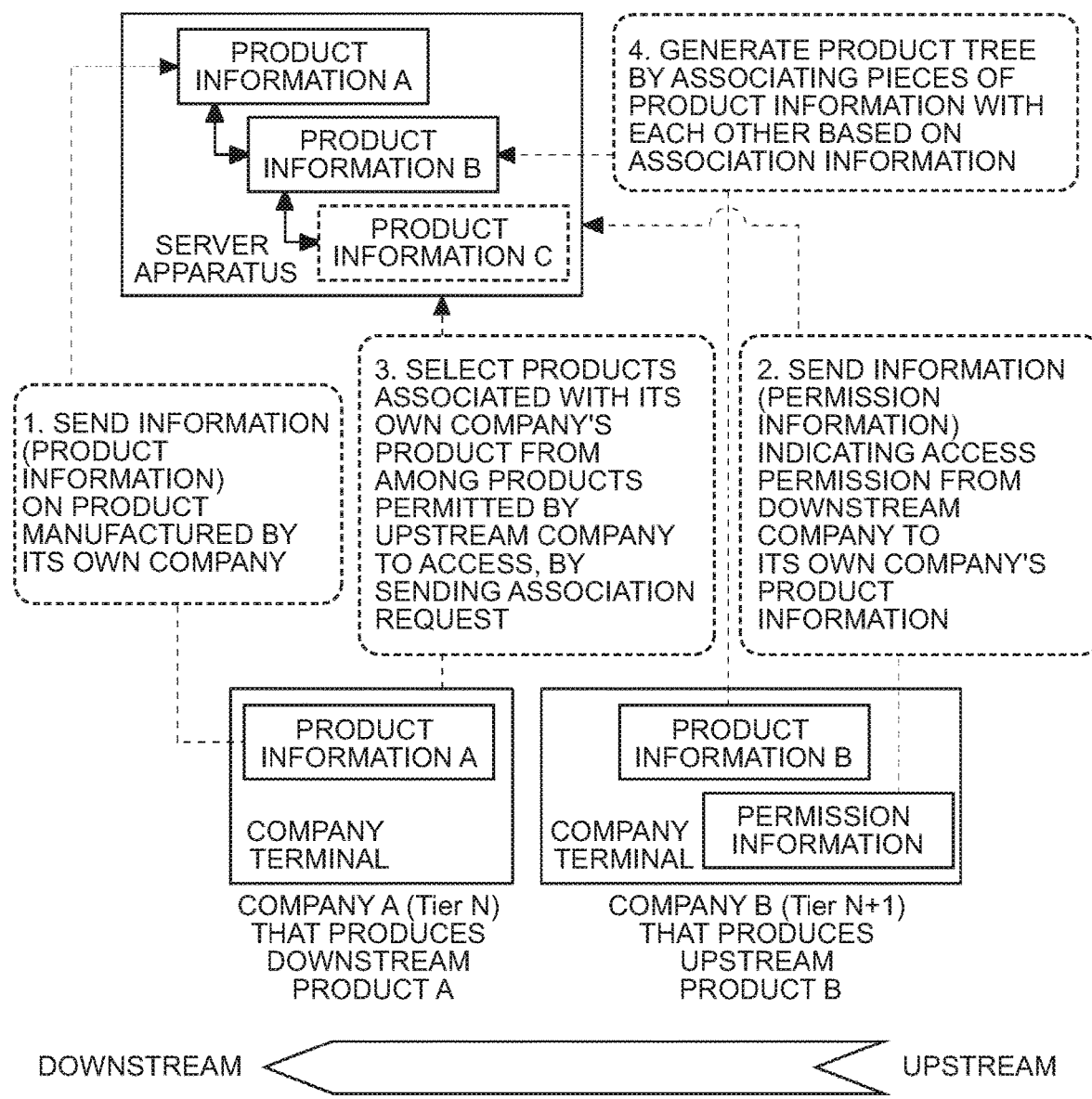
FIG. 3 is a diagram that shows the outline of a process executed between a server apparatus and company terminals.

Next, the outline of a process in which the server apparatus 1 generates a product tree will be described with reference to FIG. 3. FIG. 3 is a diagram that shows the outline of a process executed between the server apparatus 1 and the company terminals 2. In the example of FIG. 3, it is assumed that, at a selected level, there are Company A that is a downstream company and Company B that is an upstream company. It is assumed that Company B manufactures a product B and supplies the product B to Company A and Company A manufactures a product A by using the product B. In other words, in the example of FIG. 3, the product B is a child node of the product A in the product tree.

To generate a product tree, the company terminals 2 respectively corresponding to the companies each send information on products manufactured by itself to the server apparatus 1. In this example, the company terminal 2 corresponding to Company A sends product information on the product A (referred to as product information A) to the server apparatus 1. Similarly, the company terminal 2 corresponding to Company B sends product information on the product B (referred to as product information B) to the server apparatus 1. The product information of each company is stored in the server apparatus 1.

An operation to associate the pieces of product information stored in the server apparatus 1 is performed by the company terminal 2. In an example, a person in charge of the downstream company logs onto the server apparatus 1 from the company terminal 2 with an account of the downstream company and selects an upstream product with which the downstream product that is its own company's product is associated. In this way, association of pieces of product information with each other is performed from the downstream product to the upstream product. The server apparatus 1 associates the pieces of product information based on the selection.

However, when a product with which a product is associated is selected, if products in the supply chain and pieces of information on the products all are presented as choices, confidentiality of both information on companies that make up the supply chain and information on products manufactured by the companies is impaired. Furthermore, it may not be reasonable to disclose the whole of the product tree to one supplier.

For this reason, the server apparatus 1 according to the present embodiment gives in advance authority to access product information of an upstream product to a downstream company in response to a request from an upstream company. The server apparatus 1 permits access from the downstream company within the range of authority given.

In the example of FIG. 3, the company terminal 2 corresponding to Company B that is an upstream company sends the server apparatus 1 a request (information) to provide instructions to "give Company A authority to access the product information B". When the server apparatus 1 receives a request regarding association from the company terminal 2 corresponding to Company A, the server apparatus 1 provides only a list of pieces of product information of which access authority is given to Company A and prompts for selecting as a product to be associated. When there is a request to access the product tree from the company terminal 2 corresponding to Company A, the server apparatus 1 provides the company terminal 2 with a product tree in which information other than information of which access authority is given to Company A is concealed. Thus, it is possible to conceal information on irrelevant companies and products.

Hardware Configuration

Figure 4:
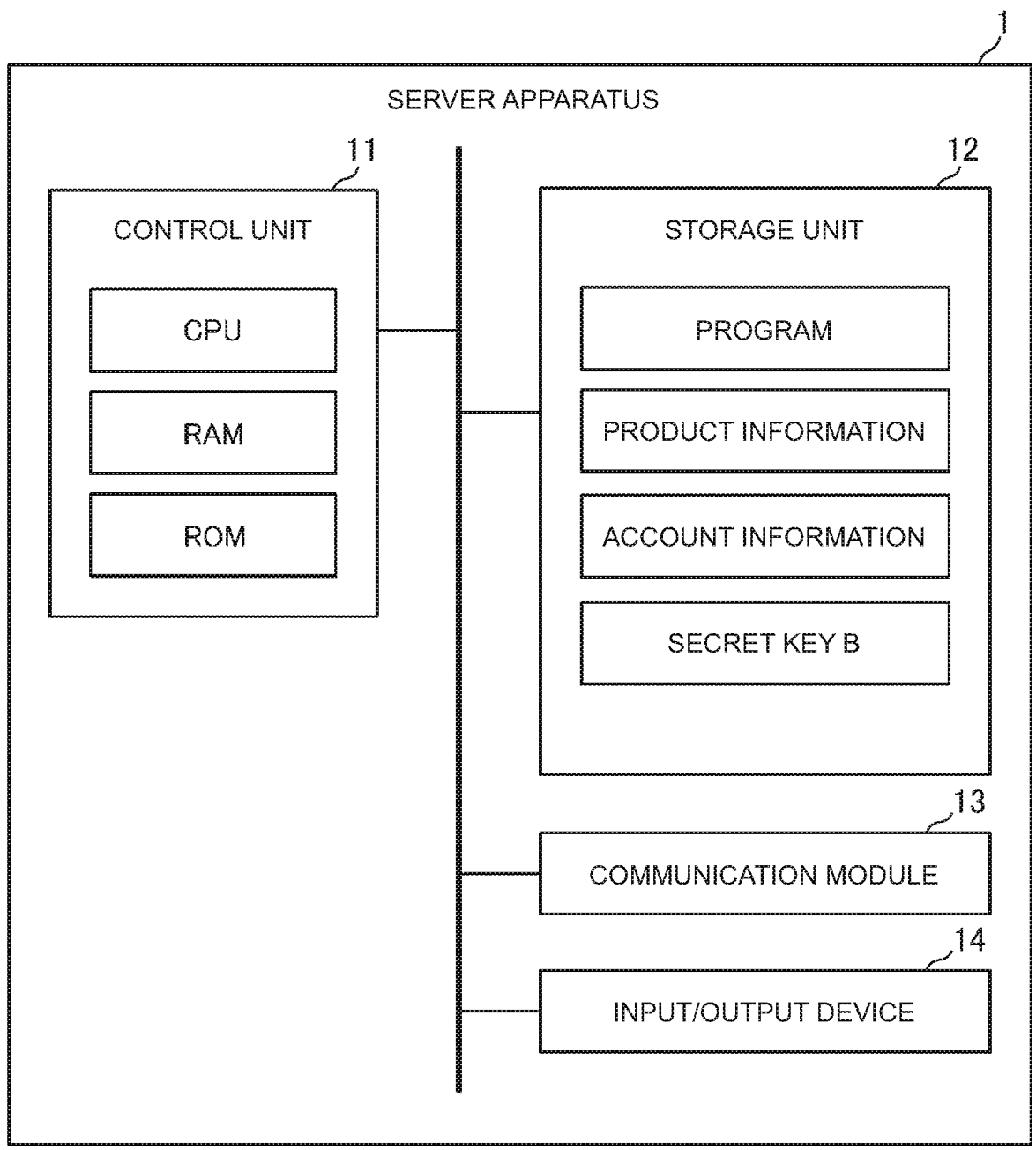
FIG. 4 is a hardware configuration diagram of the server apparatus according to the embodiment.

Next, the hardware configuration of each of the devices that make up the system will be described. FIG. 4 is a diagram that schematically shows an example of the hardware configuration of the server apparatus 1 according to the present embodiment. The server apparatus 1 is configured as a computer including a control unit 11, a storage unit 12, a communication module 13, and an input/output device 14.

The server apparatus 1 may be configured as a computer including a processor (a CPU, a GPU, or the like), a main storage device (a RAM, a ROM, or the like), and an auxiliary storage device (an EPROM, a hard disk drive, a removable medium, or the like). An operating system (OS), various programs, various tables, and the like are stored in the auxiliary storage device. Various functions (software modules) that match predetermined purposes as will be described later can be implemented by running the programs stored in the auxiliary storage device. One, some, or all of the functions may be implemented as hardware modules by a hardware circuit, such as an ASIC and an FPGA.

The control unit 11 is an arithmetic unit that implements various functions of the server apparatus 1 by running predetermined programs. The control unit 11 can be implemented by, for example, a hardware processor, such as a CPU. The control unit 11 may be configured to include a RAM, a read only memory (ROM), a cache memory, or the like.

The storage unit 12 stores information. The storage unit 12 is a storage medium, such as a RAM, a magnetic disk, and a flash memory. Programs to be run on the control unit 11, data used by the programs, and the like are stored in the storage unit 12. A database is constructed in the storage unit 12. Product information collected from the company terminals 2 and account information on companies are stored in the database. Furthermore, the secret key B corresponding to the public key B held by the certificate authority 3 is stored in the storage unit 12. The details of the storage unit 12 will be described later.

The communication module 13 is a communication interface for connecting the server apparatus 1 with a network. The communication module 13 may be configured to include, for example, a network interface board, a wireless communication interface for wireless communication, and the like. The server apparatus 1 is capable of performing data communication with other computers (for example, the company terminals 2) via the communication module 13.

The input/output device 14 receives an input operation performed by an operator and presents information to the operator. Specifically, the input/output device 14 includes a device for inputting, such as a mouse and a keyboard, and a device for outputting, such as a display and a speaker. The input/output device 14 may be, for example, integrally configured by a touch panel display or the like.

For a specific hardware configuration of the server apparatus 1, omissions, replacements, or additions of components are applicable as needed according to embodiments. For example, the control unit 11 may include a plurality of hardware processors. The hardware processor may be a microprocessor, an FPGA, a GPU, or the like. The input/output device 14 may be omitted or an input/output device (for example, an optical disk drive or the like) other than the illustrated one may be added. The server apparatus 1 may be made up of a plurality of computers. In this case, the hardware configuration of each computer may be the same or may be different.

Figure 5:
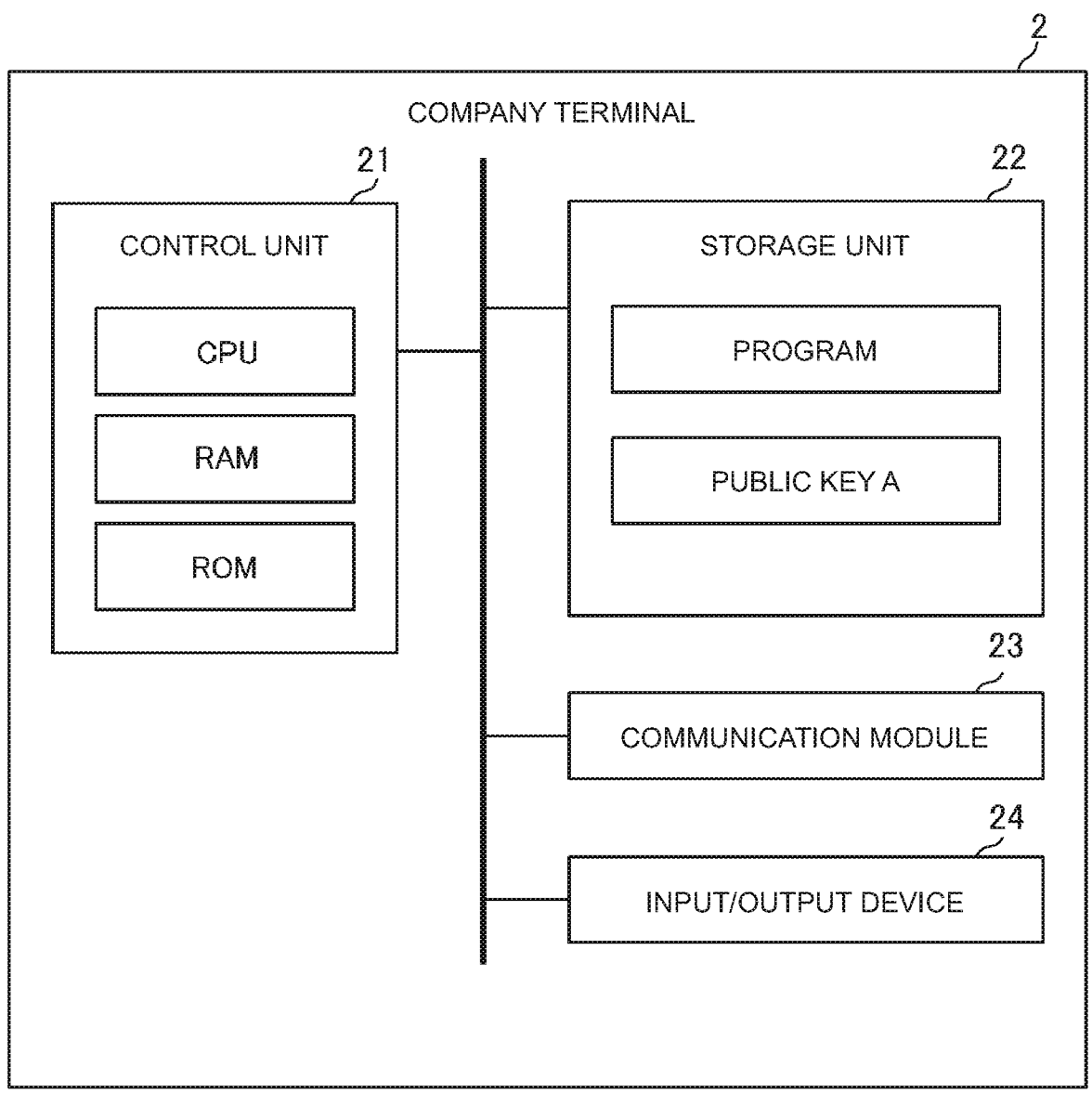
FIG. 5 is a hardware configuration diagram of each company terminal according to the embodiment.

FIG. 5 is a diagram that schematically shows an example of the hardware configuration of the company terminal 2 according to the present embodiment. The company terminal 2 is configured as a computer including a control unit 21, a storage unit 22, a communication module 23, and an input/output device 24.

The company terminal 2, as in the case of the server apparatus 1, may be configured as a computer including a processor (a CPU, a GPU, or the like), a main storage device (a RAM, a ROM, or the like), and an auxiliary storage device (an EPROM, a hard disk drive, a removable medium, or the like). One, some, or all of the functions (software modules) may be implemented as hardware modules by a hardware circuit, such as an ASIC and an FPGA.

The control unit 21 is an arithmetic unit that implements various functions (software modules) of the company terminal 2 by running predetermined programs. The control unit 21 can be implemented by, for example, a hardware processor, such as a CPU. The control unit 21 may be configured to include a RAM, a read only memory (ROM), a cache memory, or the like.

The storage unit 22 stores information. The storage unit 22 is a storage medium, such as a RAM, a magnetic disk, and a flash memory. Programs to be run on the control unit 21, data used by the programs, and the like are stored in the storage unit 22. The public key A issued by the certificate authority 3 is stored in the storage unit 22.

The communication module 23 is a communication interface for connecting the company terminal 2 with a network. The communication module 23 may be configured to include, for example, a network interface board, a wireless communication interface for wireless communication, and the like. The company terminal 2 is capable of performing data communication with another computer (for example, the server apparatus 1) via the communication module 23.

The input/output device 24 is a device that receives an input operation performed by an operator and presents information to the operator. Specifically, the input/output device 24 includes a device for inputting, such as a mouse and a keyboard, and a device for outputting, such as a display and a speaker. The input/output device 24 may be, for example, integrally configured by a touch panel display or the like.

For a specific hardware configuration of the company terminal 2, as in the case of the server apparatus 1, omissions, replacements, or additions of components are applicable as needed according to embodiments.

Software Configuration

Figure 6:
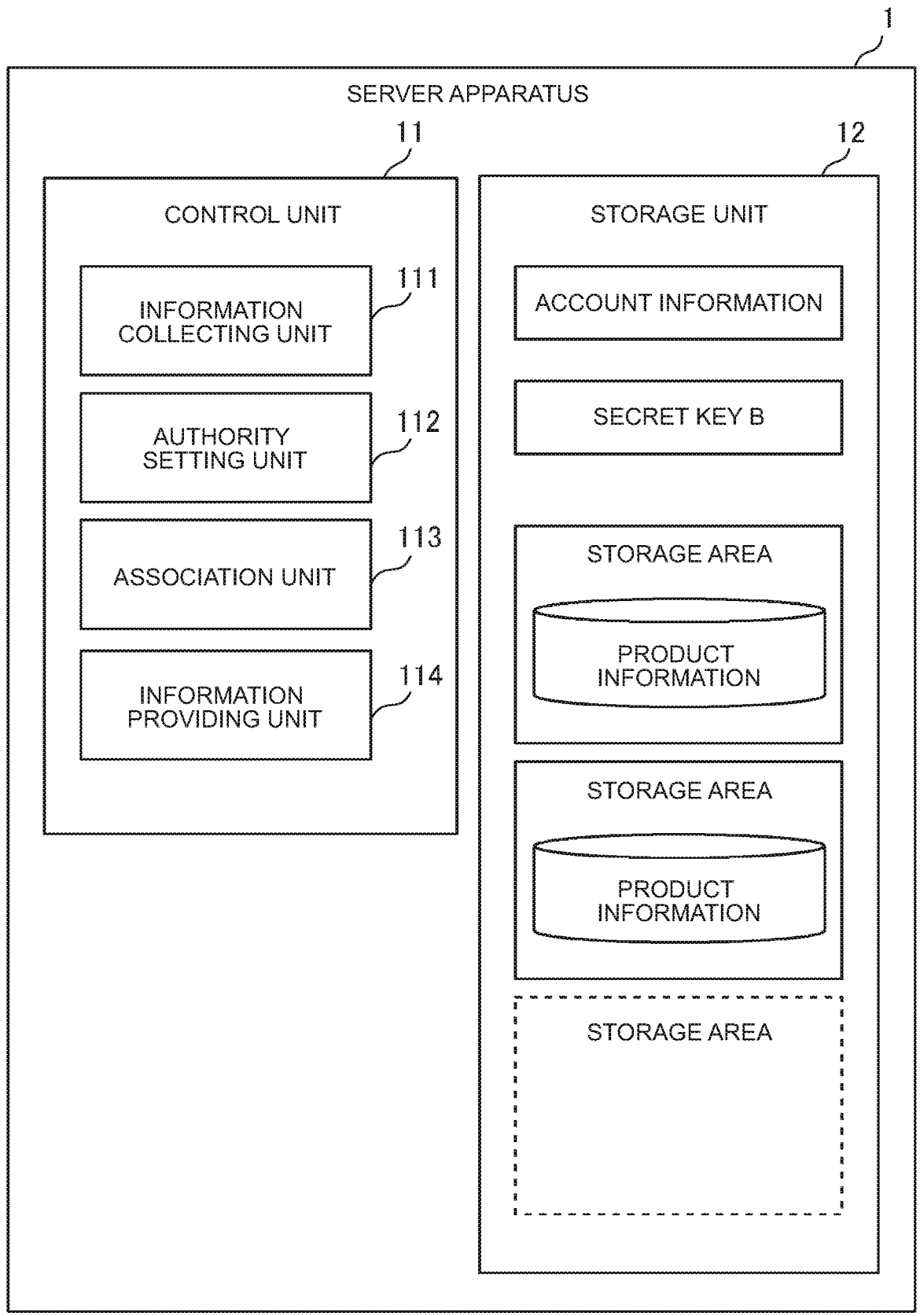
FIG. 6 is a software configuration diagram of the server apparatus according to the embodiment.

Next, the software configuration of each of the devices that make up the system will be described. FIG. 6 is a diagram that schematically shows the software configuration of the server apparatus 1 according to the present embodiment. In the present embodiment, the control unit 11 is configured to include four software modules, that is, an information collecting unit 111, an authority setting unit 112, an association unit 113, and an information providing unit 114. The software modules may be implemented by the control unit 11 (CPU) running the programs stored in the storage unit 12. Information processing executed by the information collecting unit 111, the authority setting unit 112, the association unit 113, and the information providing unit 114 is synonymous with information processing executed by the control unit 11.

The information collecting unit 111 is configured to execute a process of receiving product information sent from the company terminal 2 and storing the product information in the storage unit 12. The authority setting unit 112 is configured to receive information for setting authority to access product information (hereinafter, permission information) from the company terminal 2. Furthermore, the authority setting unit 112 is configured to execute a process of setting authority to access the product information stored in the storage unit 12 based on the information received.

The association unit 113 is configured to acquire information for associating pieces of product information with each other, from the company terminal 2 by performing interaction with the company terminal 2. Furthermore, the association unit 113 is configured to execute a process of writing information indicating an association relationship on the product information stored in the storage unit 12 based on the information acquired. The association unit 113 is configured to execute a process of receiving a request to give termination information and giving the termination information to the product information stored in the storage unit 12 in response to this request. A product tree is generated by reflecting association and giving termination. In other words, generating a product tree is saving association information and termination information in the storage unit 12. The association unit 113 is configured to generate a product tree according to the result of association and giving termination.

The information providing unit 114 is configured to execute information processing relevant to a product tree and output a result obtained by executing information processing. Outputting the result obtained by executing information processing may include a process of providing the company terminal 2 with information on the product tree generated. In an example, the information providing unit 114 is configured to generate information on a product tree and output the generated information on the product tree.

The information providing unit 114 executes information processing to integrate traceability-related information based on the generated product tree. In an example, the information providing unit 114 acquires the integrated result (for example, the total amount of emission of $CO_2$) of traceability-related information corresponding to all the processes until an end product is manufactured, by repeating integration of traceability-related information while tracking an association relationship between pieces of product information based on the product tree.

In the present embodiment, traceability-related information included in product information is encrypted with the public key A of the certificate authority 3. Therefore, the information providing unit 114 is configured to execute information processing to integrate the pieces of encrypted traceability-related information through secure computation. The encrypted integrated result of the traceability-related information is sent from the server apparatus 1 to the certificate authority 3 and is decoded with the secret key A held by the certificate authority 3. The integrated result decoded with the secret key A is encrypted with the public key B corresponding to the secret key B held by the server apparatus 1 and is sent from the certificate authority 3 to the server apparatus 1. The integrated result sent from the certificate authority 3 to the server apparatus 1 is decoded with the secret key B held by the server apparatus 1, and the decoded integrated result is output. The details of information processing to integrate pieces of traceability-related information will be described later.

In the present embodiment, the storage unit 12 is configured to include a plurality of logical storage areas. Different access authority can be set to each of the plurality of storage areas like, for example, an area in which access authority is given to Company A, an area in which access authority is given to Company B, and an area in which access authority is given to both Company A and Company B. The authority setting unit 112 sets access authority by storing product information received from the company terminal 2 in an appropriate storage area. A specific processing method will be described later.

Account information is stored in the storage unit 12. In the present embodiment, an operator of each company logs onto the server apparatus 1 by using a corresponding account of the company via the company terminal 2 to perform interaction between the server apparatus 1 and the company terminal 2. Account information is information on an account corresponding to each of the companies that make up the supply chain. Logging on by using an account is an example of a corresponding company accessing the server apparatus 1. However, a method of accessing the server apparatus 1 is not limited to such an example and may be selected as needed according to embodiments. Furthermore, the secret key B for decoding the integrated result of traceability-related information, encrypted with the public key B held by the certificate authority 3, is stored in the storage unit 12.

Figure 7:
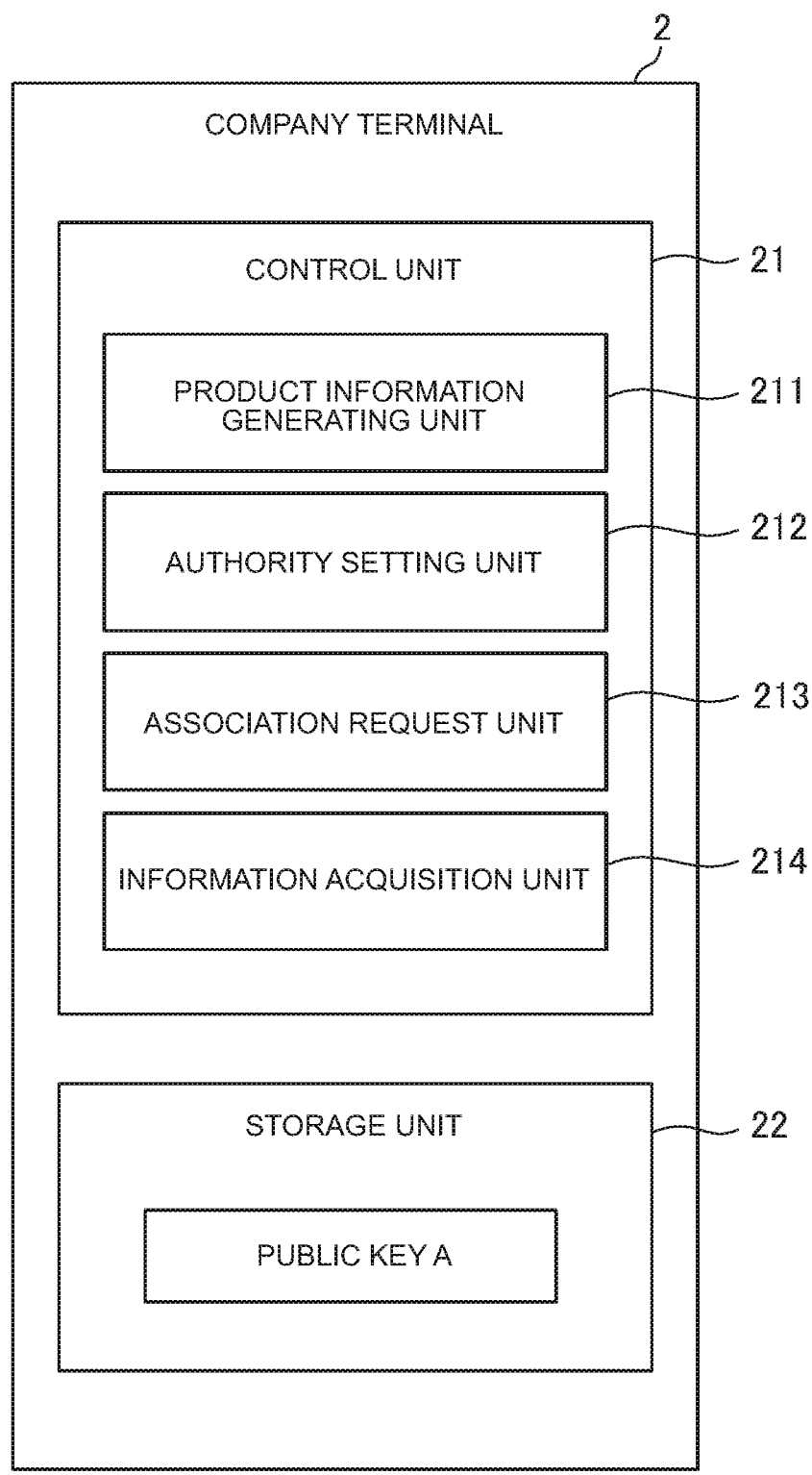
FIG. 7 is a software configuration diagram of each company terminal according to the embodiment.

FIG. 7 is a diagram that schematically shows the software configuration of the company terminal 2 according to the present embodiment. In the present embodiment, the control unit 21 is configured to include four software modules, that is, a product information generating unit 211, an authority setting unit 212, an association request unit 213, and an information acquisition unit 214. The software modules may be implemented by the control unit 21 (CPU) running the programs stored in the storage unit 22. Information processing executed by the product information generating unit 211, the authority setting unit 212, the association request unit 213, and the information acquisition unit 214 is synonymous with information processing executed by the control unit 21.

The product information generating unit 211 is configured to generate information on products (product information) of the company corresponding to the company terminal 2. FIG. 8 is an example of product information generated by the product information generating unit 211. Product information may be input via an operator of the device. In the present embodiment, product information is configured to include fields of company ID, company name, product ID, and product name. A company ID and a company name are respectively an identifier and a name of a company that manufactures a target product (that is, a company that uses the company terminal 2). A product ID and a product name are respectively an identifier and a name of the target product.

Product information is configured to include association-related information. Association-related information is information for identifying an upstream product associated with the target product. In the present embodiment, association-related information includes fields of "upstream product information", "termination flag", and "association completion flag".

The upstream product information field is configured to store information for identifying product information corresponding to the upstream product associated with the target product (that is, a product used in a process of manufacturing the target product (a product that is an inclusion product of the target product)). The upstream product information field is used when the server apparatus 1 associates products with each other. Basically, in the phase in which product information is generated, the target product is not associated with the upstream product, so a value indicating the upstream product does not need to be stored in the upstream product information field.

The termination flag field is configured to store a flag indicating whether a target product is a leaf node in a product tree, that is, a node positioned at the most upstream side (end). In the present embodiment, since the company terminals 2 send product information, the flag is used to determine whether a product is further associated on the upstream side or no more association occurs (a target product is positioned at the most upstream side) for a product in a product tree. In other words, the termination flag field is used at the time when the server apparatus 1 finalizes association of products with each other. Basically, in the phase in which product information is generated, an association relationship of the target product is not determined, so "0 (currently not a termination)" may be stored in the termination flag field. Finally, to generate a product tree, product information of each company, stored in the server apparatus 1, is set to a state of any one of "association with the upstream product has been performed" and "the termination flag is set to '1'".

The association completion flag field is configured to store a flag indicating whether association of a target product with an upstream product is complete. In the present embodiment, products in a product tree may be associated with a plurality of products on an upstream side. This is, for example, a case where product C is manufactured by using product A and product B as parts. When a target product is not a leaf node and is located at an intermediate node, it is difficult to determine whether association is complete or another product is further associated, based on only the presence or absence of a product to be associated. If it is not determined, a product tree cannot be finalized. An association completion flag is used to indicate the determination. In other words, an association completion flag is status information indicating whether all the associations are complete. The association completion flag field is used at the time when the server apparatus 1 finalizes association among products. Basically, in the phase in which product information is generated, an association relationship of the target product is not determined, so "0 (further association may occur)" may be stored in the association completion field.

Whether product information is finalized is determined by referencing a termination flag for product information located at a leaf node and referencing an association completion flag for product information located at an intermediate node. A flag (termination flag) stored in the termination flag field is an example of "termination information".

Furthermore, product information is configured to include traceability-related information encrypted with the public key A issued by the certificate authority 3. In other words, the product information generating unit 211 is configured to encrypt traceability-related information with the public key A of the certificate authority 3 and generate product information including the encrypted traceability-related information. In the present embodiment, the public key A issued by the certificate authority 3 is generated so as to have a fully homomorphic property. In other words, the public key A used to encrypt traceability-related information is generated such that secure computation of both addition and multiplication is possible in a state where a plurality of pieces of information encrypted with the public key A remains encrypted.

In the examples shown in FIG. 5 and FIG. 7, the public key A used to encrypt traceability-related information is stored in the storage unit 22. The public key A may be acquired from the certificate authority 3 at timing at which the product information generating unit 211 generates product information.

In an example, traceability-related information included in product information may include the amount of use of materials (for example, upstream products) per the amount of products manufactured, information on the recycling rate of predetermined raw materials, the amount of emission of greenhouse effect gas emitted at the time of manufacturing products, due diligence-related information, or a combination of some of them. Examples of the predetermined raw materials may include lithium, nickel, cobalt, lead, and graphite. The recycling rate may be directly represented or may be indirectly represented like, for example, a combination of a total amount of use and the amount of use of recycled materials. These values are values corresponding to a process of manufacturing a target product.

In the case of an example shown in FIG. 8, traceability-related information allowed to be included in product information A includes information obtained by encrypting, with the public key A of the certificate authority 3, the amount of use of upstream products (the amount of use of upstream products per the amount of products A manufactured), a CFP value of its own company's measurement (the amount of $CO_2$ emitted in a manufacturing activity for product A, and the like. The traceability-related information included in the product information A does not include information on a process until an upstream product is manufactured (for example, the amount of greenhouse effect gas emitted by the time the upstream product B is manufactured, or the like).

The traceability-related information may be selected as needed according to embodiments. In an example, the amount of emission of greenhouse effect gas (CFP) may include the amounts of emission of scope 1, scope 2, and scope 3. The scope 1 may be the amount of direct emission of greenhouse effect gas by itself. The scope 2 may be the amount of indirect emission resulting from use of electricity, heat, and vapor supplied from another company. The scope 3 may be the amount of indirect emission other than the scope 1 or the scope 2. In an example, the due diligence-related information may be a technical document indicating that, for a product that contains a target raw material (for example, cobalt, natural graphite, lithium, nickel, or the like), proves that obligations of the amount of raw materials contained in the product and responsible mineral procurement of a smelter or the like are fulfilled. In another example, the due diligence-related information may include a score indicating a degree to which the obligations are fulfilled.

The product information generating unit 211 is configured to acquire such information via the operator of the company terminal 2 and send the information to the server apparatus 1 at selected timing.

The authority setting unit 212 is configured to designate a downstream company permitted to access product information sent from the company terminal 2 to the server apparatus 1. FIG. 9 is an example of a screen output by the authority setting unit 212. As shown in FIG. 9, the authority setting unit 212 is configured to receive designation of a downstream company permitted to access a selected own company's product. FIG. 10 is an example of permission information generated by the authority setting unit 212 based on information input. The authority setting unit 212 is configured to send permission information to the server apparatus 1 at selected timing. The permission information is an example of permission command. Access authority may be set in units of product information or may be set in units of item included in product information ("permission item" in the table). Thus, for example, partial disclosure like, for example, the presence of a product is disclosed but specific information on materials used, the amount of use, and the like is not disclosed, is possible.

A list of companies shown on the screen of FIG. 9 may be a list of companies having dealt with the own company in the past. Therefore, the server apparatus 1 may store data on past deal (dealing data) for each company and generate a list of companies based on the dealing data. Dealing data may include, for example, an identifier of a target product, an identifier of a company that manufactures the product, a date of deal, and the like.

The association request unit 213 is configured to make a request of the server apparatus 1 to associate its own company's product information sent to the server apparatus 1 with an upstream product. In an example, initially, the association request unit 213 sends its own company ID and product ID to the server apparatus 1 and makes a request of the server apparatus 1 to associate the product ID with corresponding product information. In contrast, the server apparatus 1 generates a user interface containing a list of product information (that is, candidates to be associated) permitted to access from a target company and provides the user interface generated to the company terminal 2. FIG. 11 is an example of the user interface containing a list of products permitted to access from a target company.

The list of products shown in FIG. 11 may be a list of products that have been dealt with its own company in the past. The server apparatus 1 may generate the list further based on the dealing data stored.

Subsequently, the association request unit 213 is configured to allow the operator to select an upstream product to be associated, from the list. The association request unit 213 is configured to send an identifier of a product that is a source of association (downstream product) and an identifier of an upstream product that is a destination of association in pair to the server apparatus 1. The server apparatus 1 is allowed to associate pieces of product information with each other accordingly.

When there is no upstream product associated with a target product, it is possible to explicitly indicate the fact by, for example, checking a checkbox indicated by the reference sign 1001 in FIG. 11. In this case, association of pieces of product information is not performed, and "1" is set for the termination flag of corresponding product information by the server apparatus 1. When there is already an upstream product associated with a target product, that is, when a node corresponding to a target product is not a leaf node, the check operation is prohibited.

When association for the target product is not performed any more, it is possible to explicitly indicate the fact by, for example, checking a checkbox indicated by the reference sign 1002 in FIG. 11. In this case, "1" is set for the association completion flag of corresponding product information by the server apparatus 1. When "1" is set for the termination flag, corresponding product information is a termination, so the corresponding product information is excluded from targets to be associated. In this case, handling of the association completion flag may be selected. In an example, "1" may be set for the association completion flag in response to the fact that "1" is set for the termination flag. In another example, when "1" is set for the termination flag, the association completion flag may remain "0" and ignored.

In this way, the association request unit 213 is configured to issue any one of (1) a request to associate a target product with an upstream product and (2) a request to give a termination flag indicating that a target product is a termination in a supply chain. When completion of association is declared, an association request may include a request to give an association completion flag indicating that association for a target product does not occur any more. Thus, the server apparatus 1 is allowed to finalize the state of the product tree.

The information acquisition unit 214 is configured to make a request of the server apparatus 1 to provide a product tree and output information sent from the server apparatus 1. In the company terminal 2 of the OEM company, the information acquisition unit 214 is configured to make a request of the server apparatus 1 to provide an integrated result of traceability-related information (an integrated result of traceability-related information corresponding to all the processes until an end product is manufactured) and output the integrated result provided from the server apparatus 1.

Details of Information Processing for Generating Product Tree

Figure 12:
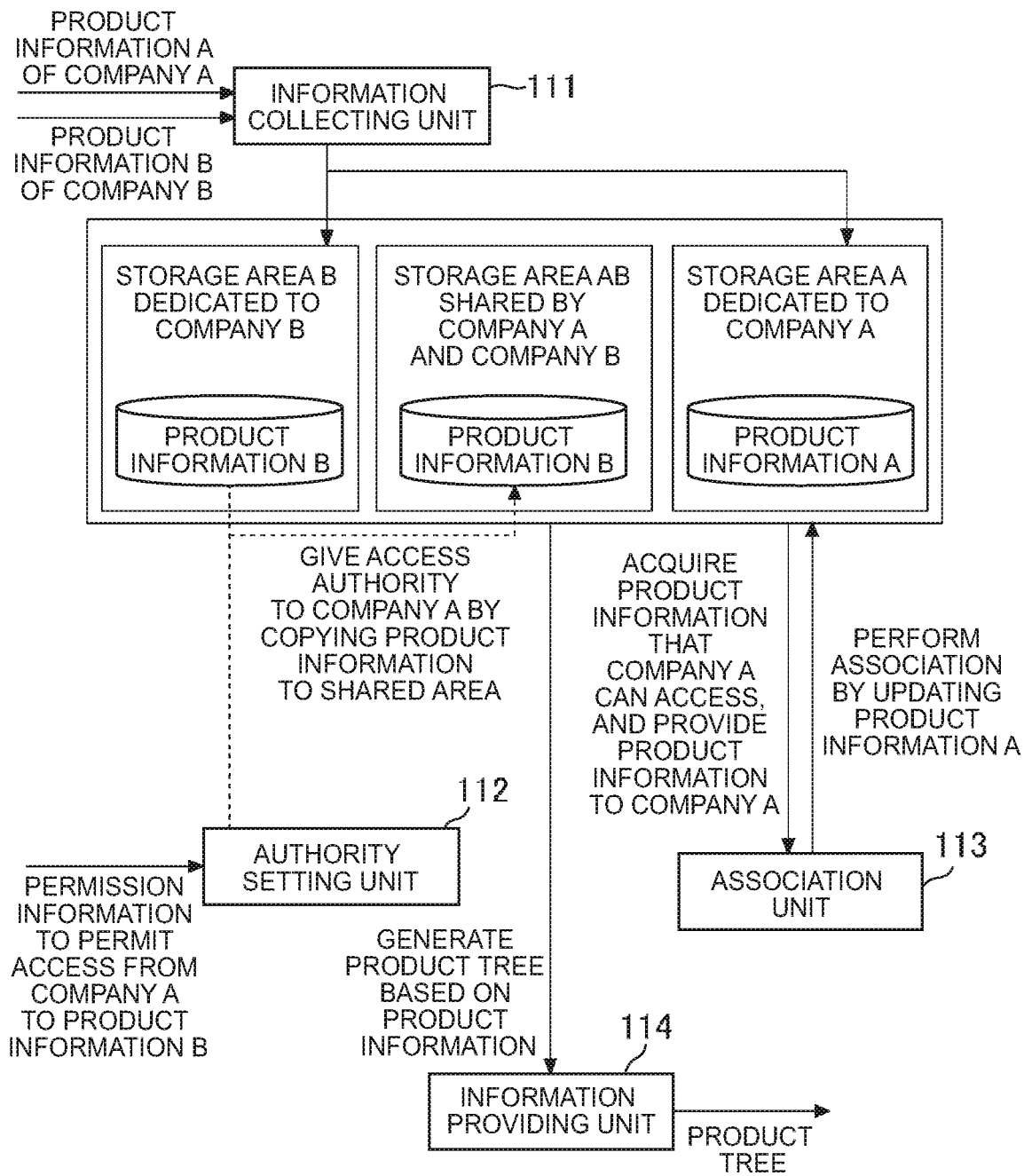
FIG. 12 is a diagram that shows an example of the flow of a process executed by the server apparatus.

Next, in generating a product tree, specific details of a process executed by the server apparatus 1 and the company terminal 2 will be described. FIG. 12 is a diagram that shows an example of the flow of a process executed by the server apparatus 1 based on a request from the company terminal 2.

The process executed by the server apparatus 1 is divided into the following four phases:
(1) a first phase in which product information sent from the company terminal 2 is received and the product information received is stored;
(2) a second phase in which permission information sent from the company terminal 2 is received and authority to access the product information is set according to the permission information received;
(3) a third phase in which pieces of product information are associated with each other by performing interaction with the company terminal 2; and
(4) a fourth phase in which information on a product tree is provided based on the result of association.

In the example of FIG. 12, it is assumed that Company A is a downstream company and Company B is an upstream company. It is also assumed that a product manufactured by Company A is a product A and a product manufactured by Company B is a product B. It is also assumed that product information corresponding to the product A is product information A and product information corresponding to the product B is product information B.

In the first phase, the information collecting unit 111 of the server apparatus 1 acquires product information from the product information generating unit 211 of the company terminal 2. In the example of FIG. 12, the server apparatus 1 acquires the product information A from the company terminal 2 corresponding to Company A and acquires the product information B from the company terminal 2 corresponding to Company B. The information collecting unit 111 saves the product information A in a storage area of which access authority is given to only Company A (hereinafter, storage area A). The information collecting unit 111 saves the product information B in a storage area of which access authority is given to only Company B (hereinafter, storage area B). In this way, the information collecting unit 111 saves product information sent from any company in a dedicated storage area of which access authority is given to only the company.

In the second phase, the authority setting unit 112 of the server apparatus 1 receives permission information from the authority setting unit 212 of the company terminal 2 and sets authority to access product information according to the permission information received. Permission information is the one that associates a product with a company that permits access to product information of the product as shown in FIG. 10.

In the example of FIG. 12, it is assumed that the authority setting unit 112 receives permission information to permit access from Company A that is the downstream company to the product information B of the upstream company. In this case, the authority setting unit 112 copies the product information B stored in the storage area B to a storage area of which access authority is given to both Company A and Company B (hereinafter, storage area AB). Thus, the product information B is placed in a state accessible from both Company A and Company B. When authority to access a specific item included in product information is not set, the item is excluded from those to be copied to the storage area AB.

In the following description, a storage area of which access authority is given to only a specific company is referred to as "dedicated storage area", and a storage area of which access authority is given to a plurality of companies is referred to as "shared storage area".

In this way, product information is copied by the server apparatus 1 in response to reception of permission information from the company terminal 2. In other words, the company terminal 2 sends permission information to the server apparatus 1 to execute an operation to copy product information identified by the permission information from a dedicated storage area of a target company to a shared storage area accessible from a downstream company.

In the third phase, the association unit 113 of the server apparatus 1 receives an association request from the association request unit 213 of the company terminal 2 and associates pieces of product information with each other based on the association request received.

Initially, the association unit 113 receives an association request from the company terminal 2. The association request is sent from the company terminal 2 of a downstream company. In the example of FIG. 12, it is assumed that the company terminal 2 of Company A has sent an association request. The association request includes a company ID and a product ID of a target product. The association unit 113 acquires product information stored in a storage area accessible from the company and generates a list of product information acquired. In the example of FIG. 11, the product information B stored in the storage area AB is accessible from Company A. Therefore, in the company terminal 2 of Company A, the product information B is selectable as a destination of association.

The association request unit 213 of the company terminal 2 presents a list to an operator and allows the operator to select products to be associated. In the case of this example, the product A and the product B are targets to be associated with each other. The operator, for example, inputs information, indicating that the upstream product is the product B for the product A, via the input/output device 24. The association request unit 213 sends data for associating the upstream product (product B) with the downstream product (product A) (association data) to the association unit 113.

As illustrated in FIG. 8, product information has a field on a product that is a destination of association (association-related information). The association unit 113 stores information corresponding to the product information B (that is, the upstream product) in the association-related information of the product information A based on the above-described association data. The association-related information may include, for example, an identifier of an upstream product, an identifier of a company that manufactures the upstream product, and the like.

A pointer or the like to product information that is a destination of association may be stored in the association-related information. A pointer is to point out the address or the like of product information corresponding to an upstream product. With the process described above, part of a tree structure in which product information of the downstream product is a parent node and product information of the upstream product is a child node is formed.

At the terminal of the product tree, further more association is not performed. In this case, the association request unit 213 sends data indicating that the product is the terminal of a tree instead of sending association data. In the case of the example of FIG. 11, when the checkbox indicated by the reference sign 1001 is checked, data indicating that the product is a termination of the tree is sent. When the association unit 113 receives the data, the association unit 113 sets "1" to the termination flag field of corresponding product information.

Furthermore, when it is clear that further association for a target product does not occur, the association request unit 213 sends data explicitly indicating that effect by incorporating the data into association data. In the case of the example of FIG. 11, when the checkbox indicated by the reference sign 1002 is checked, data indicating that further association for the product does not occur is sent. When the association unit 113 receives the data, the association unit 113 sets "1" for the association completion flag field of corresponding product information. When the termination flag is set, "1" may be set for both flags.

In other words, in the third phase, the association request unit 213 issues any one of (A) "a request to designate an upstream product that is a destination of association (including a request to set an association completion flag)" and (B) "a request to set a termination flag" to the server apparatus 1.

When association or giving a termination flag is complete for all the companies that belong to the supply chain, a product tree of an end product is finished. A course of generating the product tree may be selected. In an example, each company may execute the third phase randomly (referred to as shot gun method). With this method, it is not necessary to manage execution of the third phase, so a processing load on the server apparatus 1 is reduced. In another example, the third phase may be executed sequentially from a most upstream company (referred to as bucket brigade method). In this case, the server apparatus 1 may permit setting of an association or termination flag at TierN after completion of association at TierN−1. With this method, finishing of a product tree is easily managed.

In the fourth phase, the information providing unit 114 of the server apparatus 1 generates information on a product tree based on the product information stored and outputs information on the product tree. Generating information on a product tree indicates a process of, after a link between nodes is formed by association of pieces of product information with each other, generating various pieces of information on products (for example, an image representing a link relationship between products in a tree diagram, or the like). The process of generating information on a product tree is an example of information processing on the product tree. To generate information on a product tree, all the association of pieces of product information with each other needs to be complete, and "1" needs to be set to the termination flags of all the leaf nodes. When such conditions are satisfied, the information providing unit 114 is allowed to appropriately generate the information.

A product tree according to the present embodiment, as described with reference to FIG. 2, is the one representing a supply relationship among pieces of product information in a supply chain in a tree diagram. The information providing unit 114 is capable of generating an image representing a tree diagram based on product information. The generated product tree may be stored in the storage unit 12 of the server apparatus 1.

The information providing unit 114 may output a product tree generated in an image format. The information providing unit 114 may provide a product tree generated to the company terminal 2 in response to a request from the company terminal 2 (information acquisition unit 214). It may be not adequate to disclose the entire product tree to a specific company. For this reason, when the information providing unit 114 provides a product tree to the company terminal 2 corresponding to a company, the information providing unit 114 may execute a process of not disclosing a range of which no access authority is given to the company.

Flow of Process

Next, the flow of a process executed by the server apparatus 1 and the company terminal 2 in a case where its own company's product information is registered by the company terminal 2 will be described with reference to FIG.

Figure 13:
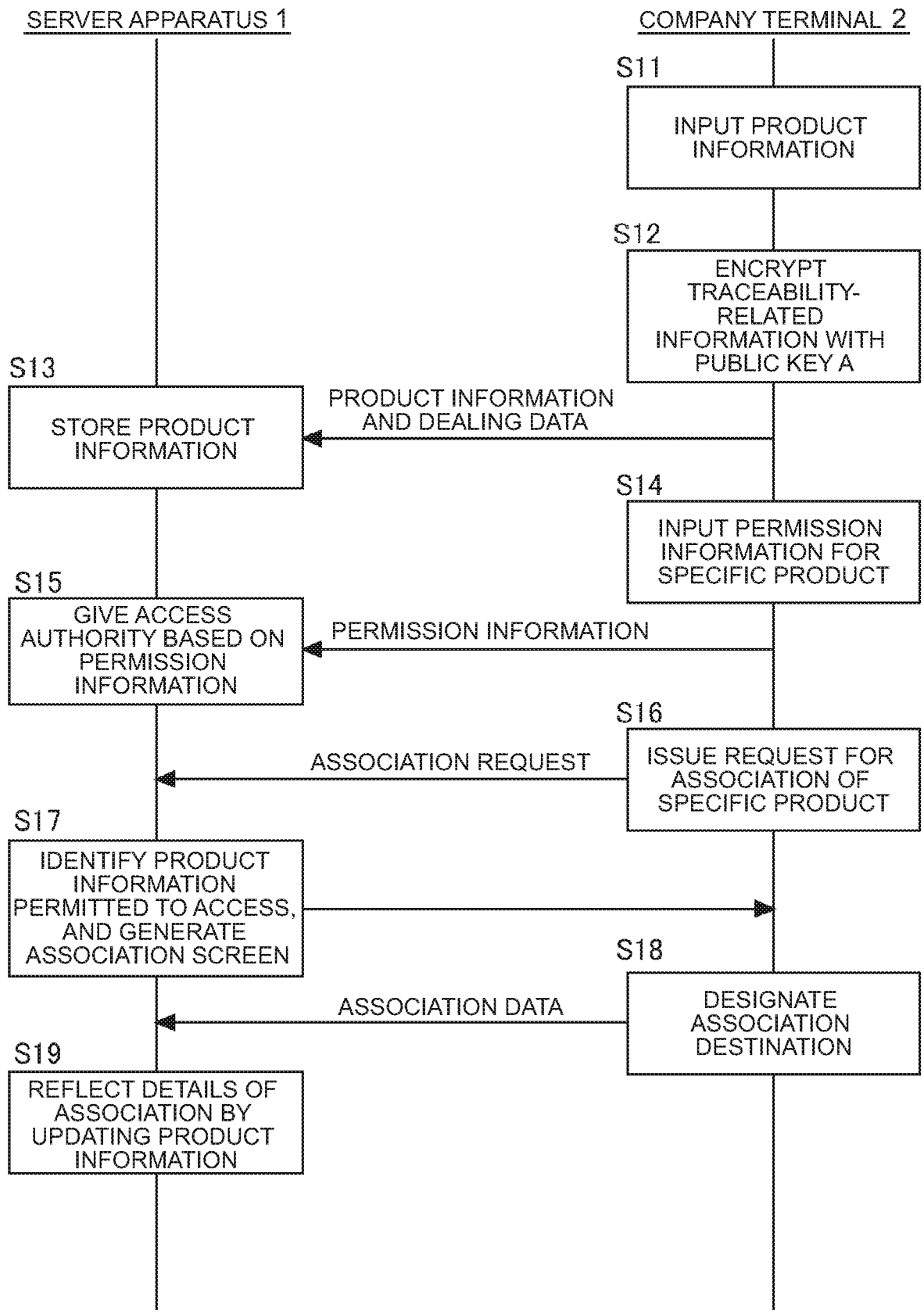
FIG. 13 is a sequence diagram that illustrates a process executed by the server apparatus and the company terminal in first to third phases.
Figure 14:
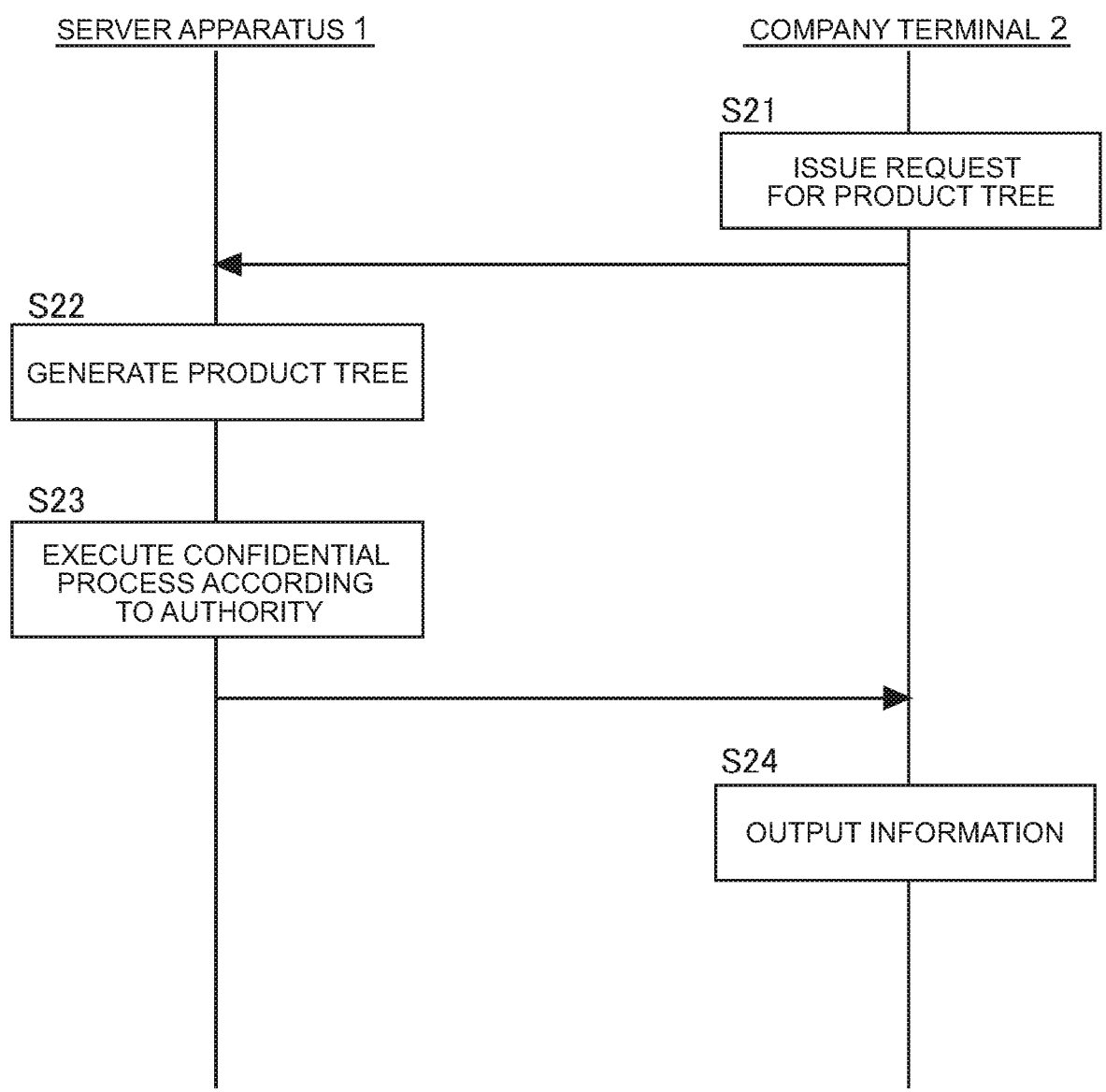
FIG. 14 is a sequence diagram that illustrates a process executed by the server apparatus and the company terminal in a fourth phase.

13 and FIG. 14. FIG. 13 is a sequence diagram corresponding to the first to third phases.

In an example, interaction between the server apparatus 1 and the company terminal 2 is started when the operator of each company logs onto the server apparatus 1 by using the corresponding account of the company via the company terminal 2. In this example, it is assumed that the operator of each company has logged onto the server apparatus 1 by using its own company's account.

Initially, in step S11, the product information generating unit 211 of the company terminal 2 acquires its own company's product information input by an operator. The product information generating unit 211 encrypts traceability-related information with the public key A of the certificate authority 3 in the input product information. The product information generating unit 211 sends product information including the encrypted traceability-related information to the server apparatus 1 (step S12).

The product information sent from the company terminal 2 is received by the server apparatus 1 (information collecting unit 111) and stored in the storage unit 12 (step S13). At this time, the information collecting unit 111 saves the product information in a dedicated storage area of which access authority is given to only the company that manufactures the corresponding product.

After that, in step S14, the authority setting unit 212 of the company terminal 2 receives, via the operator, input of information to designate a downstream company permitted to access (permission information) the product information sent in step S12. In this step, a user interface as described with reference to FIG. 9 may be provided, and a combination of a selected product with a downstream company permitted to access the product information may be allowed to be designated. The permission information input is sent to the server apparatus 1.

In step S15, the authority setting unit 112 of the server apparatus 1 gives authority to access target product information based on the permission information received. In this step, as described with reference to FIG. 12, the authority setting unit 112 gives authority to access selected product information to a selected company by copying the target product information to a shared storage area of which access authority is given to a plurality of companies. When there is no appropriate storage area of which access authority is given, the authority setting unit 112 may execute a process of generating a new storage area and giving access authority to an appropriate company.

Subsequently, in step S16, the association request unit 213 of the company terminal 2 sends data to make a request of the server apparatus 1 to associate the product information sent to the server apparatus 1 with an upstream product (association request). The association request includes its own company ID and a product ID of a target product.

In step S17, the server apparatus 1 (association unit 113) generates a list of product information permitted to access from a target company and provides the company terminal 2 with a user interface containing the list. In this step, the server apparatus 1 may provide a user interface as described with reference to FIG. 11 to the company terminal 2 and designate a combination of a selected product with an upstream product associated with the product.

In step S18, the association request unit 213 of the company terminal 2 receives from the operator a designated combination of a target product with an upstream product associated with the product. The association request unit 213 generates data indicating association of an upstream product with a downstream product (association data) and sends the association data generated to the server apparatus 1.

In step S19, the association unit 113 of the server apparatus 1 updates the product information stored based on the association data and reflects details of association of the pieces of product information with each other. Association of pieces of product information with each other may be performed by storing information (identifier, pointer, or the like) on an upstream product with association-related information of product information of a downstream product.

When there is no downstream company, processes of step S14 to step S15 may be omitted. Similarly, when there is no upstream company (when there is no destination of association for a target product), the association unit 113 may execute a process of setting the above-described termination flag instead of making a request to associate pieces of product information with each other. In this case, the processes of the above-described step S16 to step S19 are omitted.

FIG. 14 is a sequence diagram corresponding to the above-described fourth phase. Initially, in step S21, the information acquisition unit 214 of the company terminal 2 makes a request of the server apparatus 1 to provide a product tree. The request includes, for example, an identifier of a target product. The target product may be an end product or may be a product other than the end product (intermediate product).

The server apparatus 1 (information providing unit 114) having received the request generates a product tree through the above-described process (step S22). Subsequently, in step S23, the server apparatus 1 executes a process of placing information, of which no access authority is given, in a confidential state based on the access authority of a target company. When, for example, the presence itself of product information of another company is not disclosed to a company, the server apparatus 1 may execute a process of placing the presence of the product information in a confidential state. When only a specific item included in product information is undisclosed, the server apparatus 1 may execute a process of placing the details of the item in a confidential state. A product tree subjected to the confidential process is provided to the company terminal 2 (information acquisition unit 214) and output (step S24).

Details of Information Processing to Integrate Traceability-Related Information

Next, specific details of information processing to integrate traceability-related information will be described. In an example, a process of integrating traceability-related information may be executed when a product tree is generated. In another example, a process of integrating traceability-related information may be executed when a request from the company terminal 2 of a company (for example, an OEM company) included in the supply chain is accepted after the product tree is generated. A process of integrating traceability-related information may be executed at selected timing.

Figure 15:
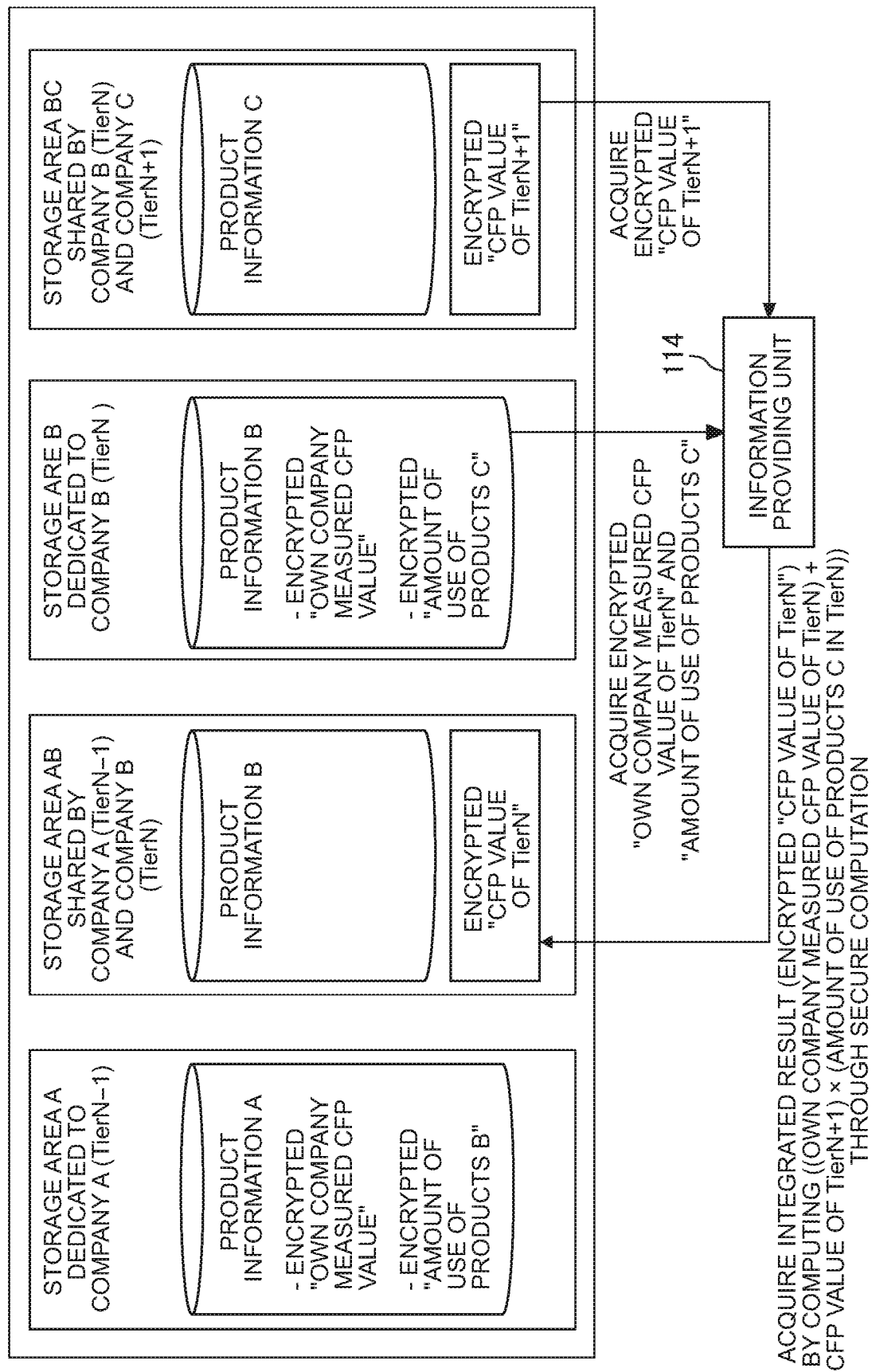
FIG. 15 is a block diagram that illustrates an example of information processing for integrating traceability-related information.

FIG. 15 is a block diagram that shows an example of information processing to integrate traceability-related information. Here, description will be made in an example in which a CFP value ($CO_2$ emission amount) is a target to be integrated. In the example shown in FIG. 15, it is assumed that a product B of Company B that belongs to TierN is a target product, a product C of Company C that belongs to TierN+1 is an upstream product of the target product (a product used in a manufacturing process for the target product (inclusion product)), and a product A of Company A that belongs to TierN−1 is a downstream product of the target product (a product in which the target product is an inclusion product). It is also assumed that product information corresponding to the product B is product information B, product information corresponding to the product C is product information C, and product information corresponding to the product A is product information A.

In the example of FIG. 15, the information providing unit 114 of the server apparatus 1 acquires the encrypted "own company measured CFP value" and "the amount of use of upstream products (the amount of use of products C)" by accessing the product information B stored in a dedicated storage area (the storage area B in FIG. 15) of which access authority is given to only Company B. The information providing unit 114 acquires the encrypted "CFP value of TierN+1" by accessing the shared storage area (the storage area BC in FIG. 15) of which access authority is given to both Company B and Company C.

Here, the "CFP value of TierN+1" is an integrated result of CFP values in a manufacturing activity from the most upstream product to the product C (that is, the total amount of $CO_2$ emitted in a manufacturing activity from the most upstream product to the product C). The encrypted "CFP value of TierN+1" is a result obtained by integrating encrypted CFP values respectively included in pieces of product information of one or more products from the most upstream product to the product C through secure computation. The encrypted "CFP value of TierN+1" is obtained with a similar method for the encrypted "CFP value of TierN" that will be described below. When the product C is the most upstream product (Company C is the most upstream company), the encrypted "CFP value of TierN" is the encrypted "own company measured CFP value" included in the product information C.

The information providing unit 114 integrates the "CFP value of TierN+1" and the CFP value included in the product information B by using the acquired information through secure computation. In the present embodiment, the "own company measured CFP value" and "the amount of use of upstream products", included in the product information B, are encrypted with the public key A having a fully homomorphic property as described by illustrating FIG. 8. Therefore, the "CFP value of TierN+1", "own company measured CFP value", and "the amount of use of upstream products" are allowed to be subjected to secure computation of both addition and multiplication while remaining encrypted. Thus, the information providing unit 114 according to the present embodiment calculates an encrypted integrated result ("CFP value of TierN" remaining encrypted with the public key A) by computing the following calculation formula through secure computation.

$$(CFP \text{ value of Tier } N) = (\text{Own company measured } CFP \text{ value of}$$
$$\text{Tier } N) + (CFP \text{ value of Tier } N + 1) \times (\text{Amount of use of products } C)$$

A case where there is a plurality of inclusion products of a target product can also be assumed. For example, in the example shown in FIG. 2, product A12 of Tier2 includes three products A121, A122, A123 of Tier3. In this case, for each of the three products A121, A122, A123, (CFP value of TierN+1)×(Amount of use of upstream products (Amount of use in TierN)) needs to be computed, and a total sum of those computed results needs to be computed. Thus, the information providing unit 114 may calculate the encrypted integrated result ("CFP value of TierN" remaining encrypted with the public key A) by computing the following calculation formula through secure computation.

$$(CFP \text{ value of Tier } N) = (\text{Own company measured } CFP \text{ value of}$$
$$\text{Tier } N) + \sum\nolimits_k ((CFP \text{ value of } k \text{ company } (\text{Tier } N + 1)) \times (\text{Amount of}$$
$$\text{use } u_k \text{ in Tier } N))$$

In the above calculation formula, k is the number of companies that manufacture products (TierN+1 products) included in a target product (TierN product). For example, when the target product is product A12 (Tier2 product) illustrated in FIG. 2, three products A121, A122, A123 manufactured by three companies are inclusion products (Tier3 products), so k=3. When the target product is product A11 (Tier2 product) illustrated in FIG. 2, one product A111 manufactured by one company is an inclusion product (Tier3 product), so k=1.

When the "CFP value of TierN" remaining encrypted is obtained through the secure computation, the information providing unit 114 stores the "CFP value of TierN" remaining encrypted in a shared storage area (storage area AB in FIG. 15) of which access authority is given to both Company A and Company B.

After the "CFP value of TierN" remaining encrypted is calculated, the information providing unit 114 shifts the target product to a product downstream by one level (in the example shown in FIG. 15, product A of TierN−1) and computes an encrypted "CFP value of TierN−1". In this case, the information providing unit 114 executes secure computation by using the integrated result (encrypted "CFP value of TierN") and the encrypted "own company measured CFP value" and "the amount of use of upstream products" included in the product information A. The information providing unit 114 can obtain a "CFP value of Tier0 (the total amount of $CO_2$ emitted in a manufacturing activity from the most upstream product to the end product)" remaining encrypted with the public key A, by sequentially repeating the above-described process from when the target product is a product downstream by one level from the most upstream product to when the target product is the end product (Tier0 product).

The information providing unit 114 sends, to the certificate authority 3, a request to decode the "CFP value of Tier0" remaining encrypted. In the certificate authority 3 having received the request, the "CFP value of Tier0" remaining encrypted is decoded with the secret key A (secret key corresponding to the public key A used to encrypt traceability-related information included in product information) held by the certificate authority 3. Subsequently, in the certificate authority 3, the decoded "CFP value of Tier0" is encrypted with the public key B (public key corresponding to the secret key B held by the server apparatus 1). The "CFP value of Tier0" encrypted with the public key B is sent from the certificate authority 3 to the server apparatus 1.

In the server apparatus 1 having received the "CFP value of Tier0" encrypted with the public key B, the information providing unit 114 decodes the "CFP value of Tier0" encrypted with the public key B, by using the secret key B held by the server apparatus 1. The information providing unit 114 outputs the decoded "CFP value of Tier0". In an example, the information providing unit 114 sends the decoded "CFP value of Tier0" to the company terminal 2 of a most downstream company (OEM company). Thus, the most downstream company (OEM company) can find the total amount of $CO_2$ emitted in all the processes until its own company's product (end product) is manufactured.

A process of computing the encrypted "CFP value of TierN" through secure computation may be executed before a product tree is generated and at the time when association of pieces of product information from the most upstream product to a product of TierN completes.

The information providing unit 114 may be configured to decode the "CFP value of TierN" remaining encrypted through the certificate authority 3 in response to a request from the company terminal 2 of Company B and send the decoded "CFP value of TierN" to the company terminal 2 of Company B.

In this way, the information providing unit 114 repeatedly executes a process of sequentially integrating traceability-related information defined for each piece of product information from the most upstream side toward the most downstream side. In the above description, a CFP value ($CO_2$ emission amount) is illustrated as a target of integration; however, traceability-related information that is a target of integration may be a recycling rate related to a predetermined raw material, a score for due diligence, or the like. When the traceability-related information is a numeric value, integration may be performed by mathematical operations. When the traceability-related information is information other than a numeric value (for example, due diligence-related information or the like), integration may be simple information collection.

Figure 16:
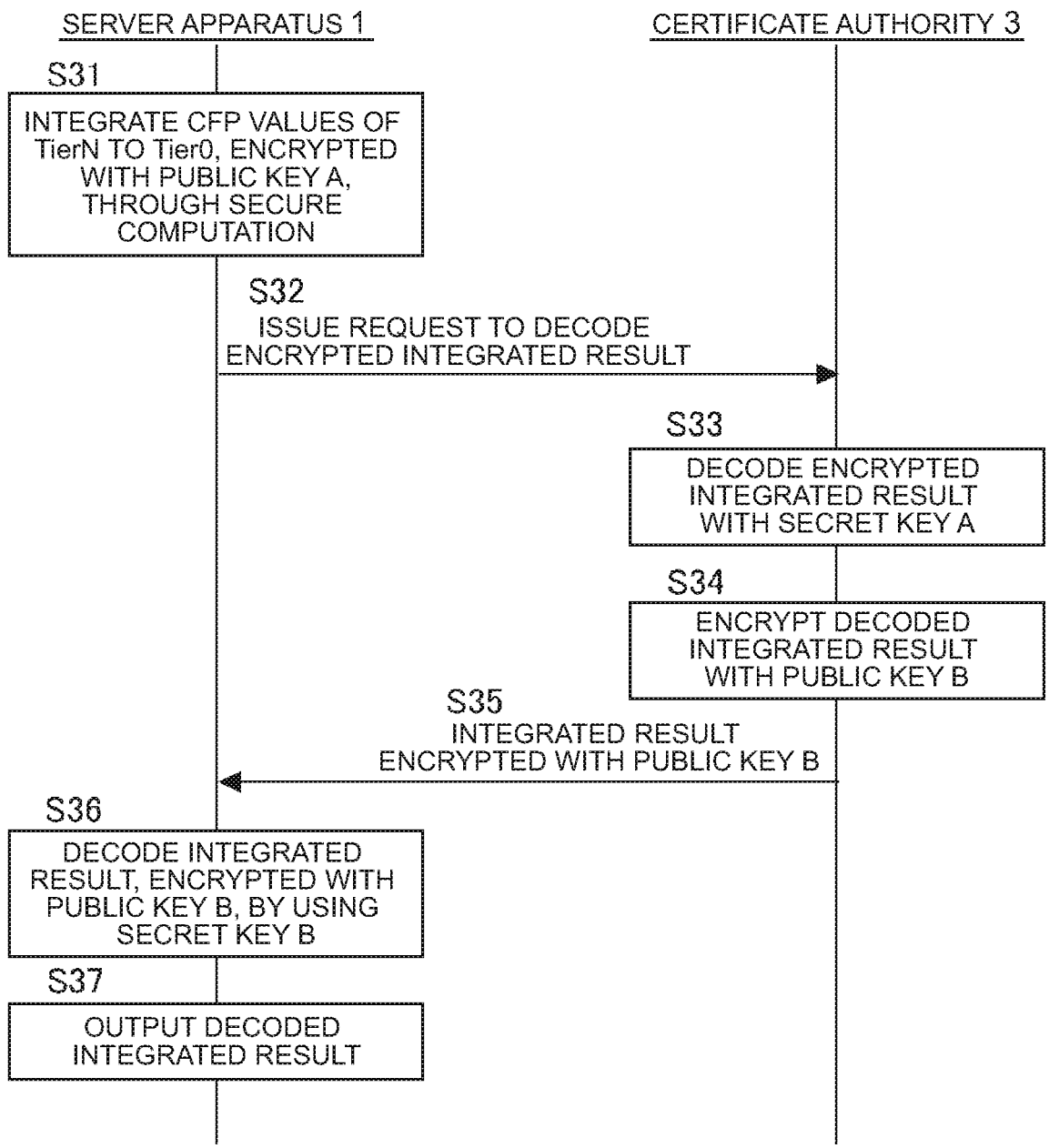
FIG. 16 is a sequence diagram that illustrates a process executed in the system at the time of integrating traceability-related information.

Here, FIG. 16 shows a sequence of a process that is executed in the system according to the present embodiment at the time of integrating traceability-related information. Here, description will be made in an example in which a CFP value ($CO_2$ emission amount) is a target to be integrated as in the case of the example described with reference to FIG. 15.

In the example shown in FIG. 16, initially, in step S31, the information providing unit 114 of the server apparatus 1 integrates CFP values respectively included in pieces of product information from a TierN product to a Tier0 product by tracing association of pieces of product information from the most upstream product (TierN product) to the end product (Tier0 product) based on a product tree. In the present embodiment, CFP values ("own company measured CFP value" and "the amount of use of upstream products" illustrated in FIG. 8) included in pieces of product information from the TierN product to the Tier0 product are encrypted with the public key A having a fully homomorphic property. Therefore, the information providing unit 114 according to the present embodiment calculates an integrated result remaining encrypted (the "CFP value of TierN" remaining encrypted) by computing the above-described calculation formula ((CFP value of TierN)=(Own company measured CFP value of TierN)+$\Sigma_k$((CFP value of k company (TierN+1))×(Amount of use $u_k$ in TierN)) through secure computation. The information providing unit 114 can obtain a final integrated result remaining encrypted ("CFP value of Tier0 (the total amount of $CO_2$ emitted in a manufacturing activity from the most upstream product to the end product)" remaining encrypted) by sequentially repeating the above-described process from when the target product is a product downstream by one level from the most upstream product to when the target product is the end product (Tier0 product). The information providing unit 114 sends, to the certificate authority 3, a request to decode the final integrated result remaining encrypted ("CFP value of Tier0" remaining encrypted) (decoding request) (step S32).

In the certificate authority 3 having received the decoding request, the integrated result remaining encrypted (the "CFP value of TierN" remaining encrypted) is decoded with the secret key A held by the certificate authority 3 (step S33). Subsequently, in the certificate authority 3, the decoded integrated result ("CFP value of TierN") is encrypted with the public key B corresponding to the secret key B held by the server apparatus 1 (step S34). The integrated result encrypted with the public key B (the "CFP value of TierN" encrypted with the public key B) is sent from the certificate authority 3 to the server apparatus 1 (step S35).

In the server apparatus 1 having received the integrated result encrypted with the public key B ("CFP value of TierN" encrypted with the public key B), the information providing unit 114 decodes the integrated result received from the certificate authority 3 ("CFP value of TierN" encrypted with the public key B) by using the secret key B held by the server apparatus 1 (step S36). Subsequently, the information providing unit 114 outputs the decoded integrated result ("CFP value of TierN") (step S37). In an example, outputting the decoded integrated result ("CFP value of TierN") may include sending the integrated result ("CFP value of TierN") from the server apparatus 1 to the company terminal 2 of a company of Tier0 (an OEM company that manufactures an end product).

Flow of Process

Figure 17:
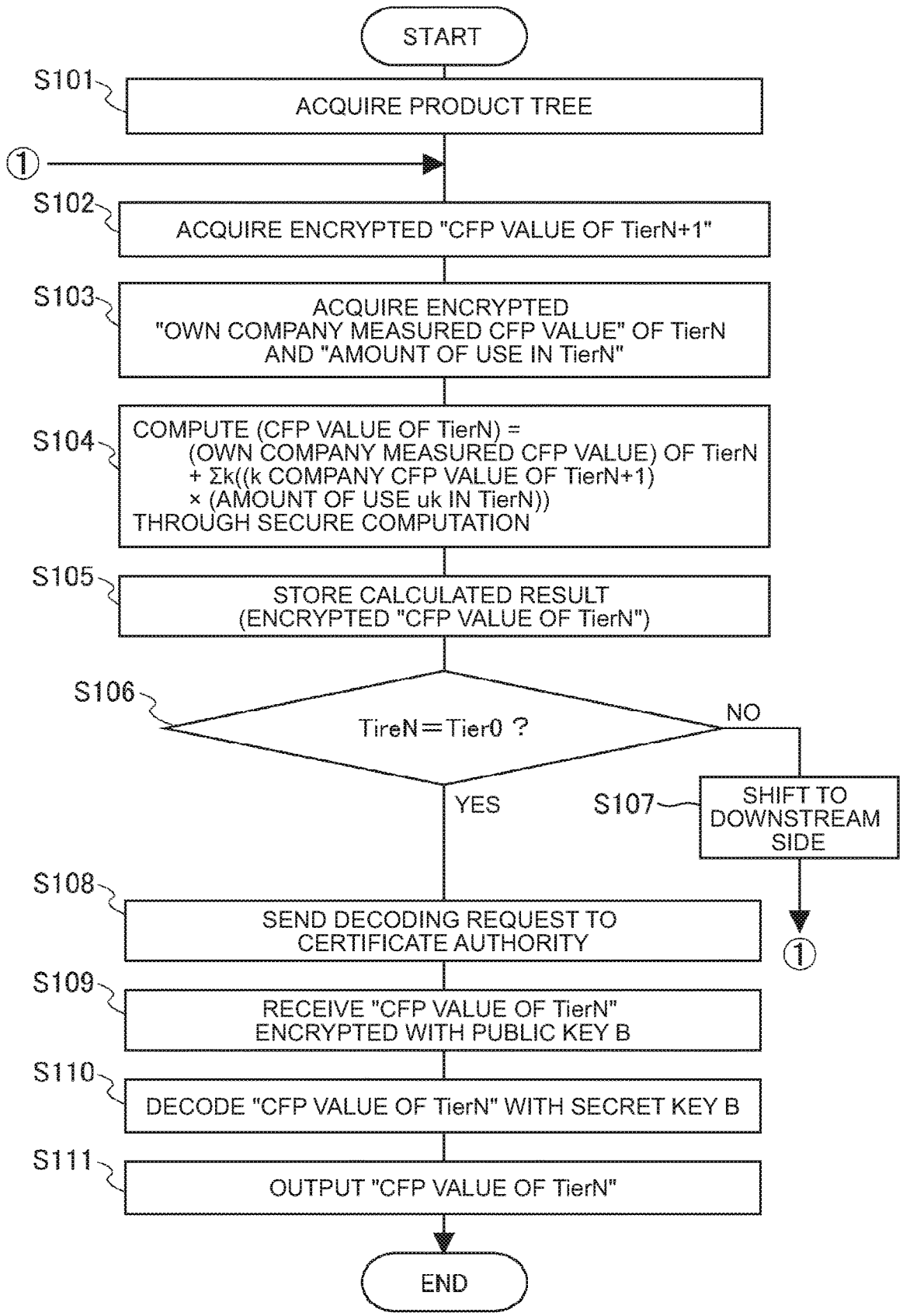
FIG. 17 is a flowchart that shows an example of the flow of a process executed by the server apparatus at the time of integrating traceability-related information according to the embodiment.

FIG. 17 is a flowchart that shows the flow of a process (an example of a specific procedure of step S31, step S32, and step S35 to step S37 in FIG. 16) executed by the server apparatus 1 at the time of integrating traceability-related information. In an example, the flow of the process shown in FIG. 17 may be executed when a product tree is generated. In another example, the flow of the process shown in FIG. 17 may be executed after a product tree is generated and a request from the company of Tier0 (OEM company) is accepted.

An entity to execute the flow of the process shown in FIG. 17 is the processor of the server apparatus 1; however, the description will be made on the assumption that the software module of the server apparatus 1 is an entity to execute the flow of the process.

In the flow of the process of FIG. 17, when a trigger event (for example, generation of a product tree, accepting a request from the company of Tier0, or the like) occurs, the information providing unit 114 of the server apparatus 1 acquires a product tree corresponding to a Tier0 product (step S101). In an example, acquiring a product tree may be information processing to generate a product tree as described with reference to FIG. 12 to FIG. 14. In another example, acquiring a product tree may be information processing to access an already generated product tree stored in the storage unit 12. When the product information generating unit 211 finishes execution of the process of step S101, the product information generating unit 211 executes a process in step S102 and the following steps.

Here, products (TierN products) that are targets of the processes of step S102 to step S105 in the process of step S102 and the following processes in FIG. 17 include products downstream by one level from the most upstream product (products in which the most upstream product is an inclusion product) to an end product (Tier0 product) in the product tree.

In step S102, the information providing unit 114 acquires the encrypted "CFP value of TierN+1" upstream (TierN+1) by one level than a target product (TierN product). Specifically, the information providing unit 114 accesses a shared storage area of which access authority is given to both a company that manufactures the target product (TierN product) and a company that manufactures the inclusion product (TierN+1 product) of the target product (TierN product) and acquires the encrypted "CFP value of TierN+1" stored in the shared storage area. However, when the inclusion product (TierN+1 product) of the target product (TierN product) is the most upstream product, the information providing unit 114 accesses the shared storage area (or a dedicated storage area of the company that manufactures the inclusion product (TierN+1 product)) and acquires the encrypted "own company measured CFP value" included in the product information of the inclusion product (TierN+1 product) as the "CFP value of TierN+1"

When there is a plurality of inclusion products (TierN+1 products) of the target product (TierN product), the information providing unit 114 acquires the "CFP value of TierN+1" corresponding to each of the inclusion products (TierN+1 products).

When the information providing unit 114 finishes execution of the process of step S102, the information providing unit 114 executes the process of step S103. In step S103, the information providing unit 114 accesses a dedicated storage area of the company that manufactures the target product (TierN product) and acquires the encrypted "own company measured CFP value" and "the amount of use of upstream products (the amount of use in TierN)", included in the product information of the target product (TierN product).

When there is a plurality of inclusion products (TierN+1 products) of the target product (TierN product), the information providing unit 114 acquires "the amount of use of upstream products (the amount of use in TierN)" corresponding to each of the plurality of inclusion products (TierN+1 products).

When the information providing unit 114 finishes execution of the process of step S103, the information providing unit 114 executes the process of step S104. In step S104, the information providing unit 114 computes the following calculation formula through secure computation by using the information acquired in step S102 and step S103.

$$(CFP \text{ value of Tier } N) = (\text{Own company measured } CFP \text{ value of Tier } N) + \sum_k ((CFP \text{ value of } k \text{ company (Tier } N+1)) \times (\text{Amount of use } u_k \text{ in Tier } N))$$

When the information providing unit 114 finishes execution of the process of step S104, the information providing unit 114 executes the process of step S105. In step S105, the information providing unit 114 stores the calculated result of step S104 ("CFP value of TierN" remaining encrypted) in a shared storage area of which access authority is given to both the company that manufactures the target product (TierN product) and a company that manufactures a downstream product (TierN−1 product) of the target product (TierN product). When the information providing unit 114 finishes execution of the process of step S105, the information providing unit 114 executes the process of step S106.

In step S106, the information providing unit 114 determines whether the target product (TierN product) is an end product (Tier0 product) (TierN=Tier0). When the target product (TierN product) is not an end product (Tier0 product), the information providing unit 114 executes the process of step S107.

In step S107, the information providing unit 114 shifts the target product (TierN product) to a product downstream by one level. When the information providing unit 114 finishes execution of step S107, the information providing unit 114 executes the processes of step S102 to step S105 for the shifted target product. When the processes of step S102 to step S105 are executed for each of the products from the product downstream by one level from the most upstream product (the product in which the most upstream product is an inclusion product) to the end product (Tier0 product) in the product tree, the determination is affirmative in step S106. When the determination is affirmative in step S106, the information providing unit 114 executes the processes of step S108 to step S111.

Initially, in step S108, the information providing unit 114 sends, to the certificate authority 3, a request to decode a final integrated result remaining encrypted ("CFP value of Tier0" remaining encrypted) (decoding request). In this case, in the certificate authority 3, the integrated result remaining encrypted ("CFP value of Tier0" remaining encrypted) is decoded with the secret key A held by the certificate authority 3. Furthermore, in the certificate authority 3, the decoded integrated result ("CFP value of Tier0") is encrypted with the public key B corresponding to the secret key B held by the server apparatus 1. The integrated result encrypted with the public key B ("CFP value of Tier0" encrypted with the public key B) is sent from the certificate authority 3 to the server apparatus 1.

When the integrated result encrypted with the public key B ("CFP value of Tier0" encrypted with the public key B) is sent from the certificate authority 3 to the server apparatus 1, the information providing unit 114 of the server apparatus 1 receives the information through the communication module 13 (step S109). When the information providing unit 114 finishes execution of the process of step S109, the information providing unit 114 executes the process of step S110.

In step S110, the information providing unit 114 decodes the integrated result encrypted with the public key B ("CFP value of Tier0" encrypted with the public key B) by using the secret key B held by the server apparatus 1. When the information providing unit 114 finishes execution of the process of step S110, the information providing unit 114 executes the process of step S111.

In step S111, the information providing unit 114 outputs the integrated result decoded in step S110 ("CFP value of Tier0"). In an example, the information providing unit 114 sends the decoded integrated result ("CFP value of Tier0") to the company terminal 2 of an OEM company. When the information providing unit 114 finishes execution of the process of step S111, the flow of the process of FIG. 17 ends.

As described above, in the present embodiment, in the system that generates a product tree by collecting product information from the company terminal 2 of each of companies that belong to a supply chain, traceability-related information included in the product information is encrypted with the public key A of the certificate authority 3. Thus, it is possible to reduce a situation that the encrypted traceability-related information is decoded by a person other than the certificate authority 3 that holds the secret key A corresponding to the public key A. As a result, confidentiality of traceability-related information of a product supplied by the supply chain is ensured.

In the present embodiment, the public key A generated by the certificate authority 3 so as to have a fully homomorphic property is used as a public key used to encrypt traceability-related information. Thus, the server apparatus 1 is capable of integrating traceability-related information remaining encrypted, by calculating the traceability-related information remaining encrypted through secure computation. Furthermore, when the certificate authority 3 is caused to decode the calculated result of secure computation (the integrated result of traceability-related information remaining encrypted), only the integrated result of traceability-related information can be provided to a company (for example, an OEM company) in a plain text.

Furthermore, in the present embodiment, the integrated result of traceability-related information, decoded by the certificate authority 3, is sent from the certificate authority 3 to the server apparatus 1 in an encrypted state that the server apparatus 1 is allowed to decode. In an example, the integrated result of traceability-related information is sent from the certificate authority 3 to the server apparatus 1 in a state encrypted with the public key B corresponding to the secret key B held by the server apparatus 1. Thus, it is also possible to reduce a situation that the decoded integrated result of the traceability-related information is identified by a third party.

Therefore, according to the present embodiment, it is possible to collect and integrate traceability-related information over the entire supply chain while ensuring confidentiality of traceability-related information of a product supplied by the supply chain.

Modification of Embodiment

In the above-described embodiment, an example in which traceability-related information included in product information is encrypted with the public key A having a fully homomorphic property has been described. In contrast, in the modification, an example in which traceability-related information included in product information is encrypted with a public key having a multiplication homomorphic property and a public key having an addition homomorphic property has been described. Hereinafter, a public key having a multiplication homomorphic property is referred to as public key A1, and a public key having an addition homomorphic property is referred to as public key A2. These public keys A1, A2 are generated by the certificate authority 3. A secret key A1 corresponding to the public key A1 and a secret key A2 corresponding to the public key A2 are held only by the certificate authority 3. Accordingly, the public keys A1, A2 are stored in the storage unit 22 of the company terminal 2 instead of the public key A.

In the example described with reference to FIG. 15 in the above-described embodiment, both "own company measured CFP value" and "the amount of use of upstream products", included in the product information, are encrypted with the public key A having a fully homomorphic property. In contrast, in the modification, "own company measured CFP value" included in the product information is encrypted with the public key A2, and "the amount of use of upstream products" included in the product information is encrypted with the public key A1. In other words, in the modification, the product information generating unit 211 of the company terminal 2 is configured to generate product information by encrypting the "own company measured CFP value" with the public key A2 and encrypting "the amount of use of upstream products" with the public key A1. However, in the company terminal 2 of the most upstream company, the product information generating unit 211 is configured to generate product information by encrypting the "own company measured CFP value" with the public key A1.

In the modification, the information providing unit 114 of the server apparatus 1 is configured to execute the following information processing at the time of integrating traceability-related information.

Initially, the information providing unit 114 calculates the calculation formula (CFP value of TierN+1)×(Amount of use in TierN) through secure computation by using the "CFP value of TierN+1" and "the amount of use in TierN" encrypted with the public key A1. The secure computation is performed for all the products (TierN+1 products) included in the target product (TierN product). When, for example, the number of inclusion products (TierN+1 products) of the target product (TierN product) is k, the secure computation is performed for each of the k inclusion products (TierN+1 products).

The "CFP value of TierN+1" used in the secure computation is encrypted with the public key A1 having a multiplication homomorphic property and stored in a shared storage area of which access authority is given to both a company that manufactures the target product (TierN product) and a company that manufactures the inclusion product (TierN+1 product) of the target product (TierN product).

Subsequently, the information providing unit 114 sends, to the certificate authority 3, a request to convert the calculated result of the secure computation (("CFP value of TierN+1" remaining encrypted with the public key A1)× (Amount of use in TierN)) into a state encrypted with the public key A2 (hereinafter, which may be referred to as first conversion request). At this time, when the number of the inclusion products (TierN+1 products) is k, the first conversion request including the k calculated results is sent from the server apparatus 1 to the certificate authority 3.

In the certificate authority 3 having received the first conversion request, the calculated result remaining encrypted with the public key A1 (("CFP value of TierN+1" remaining encrypted with the public key A1)×(Amount of use in TierN)) is decoded with the secret key A1 corresponding to the public key A1. Furthermore, in the certificate authority 3, the decoded calculated result ((CFP value of TierN+1)×(Amount of use in TierN)) is encrypted with the public key A2. The calculated result encrypted with the public key A2 ((CFP value of TierN+1)×(Amount of use in TierN), encrypted with the public key A2) is sent from the certificate authority 3 to the server apparatus 1.

In the server apparatus 1 having received the calculated result encrypted with the public key A2 ((CFP value of TierN+1)×(Amount of use in TierN), encrypted with the public key A2), the information providing unit 114 calculates an integrated result remaining encrypted with the public key A2 ("CFP value of TierN" remaining encrypted with the public key A2) by computing the following calculation formula through secure computation.

$$(CFP \text{ value of Tier } N) = (\text{Own company measured } CFP \text{ value of Tier } N) + \sum_{k}((CFP \text{ value of } k \text{ company (Tier } N+1)) \times (\text{Amount of use } u_k \text{ in Tier } N))$$

Calculation of $\Sigma_k$((CFP value of k company (TierN+1))× (Amount of use $u_k$ in TierN)) may be performed by the certificate authority 3. In other words, the certificate authority 3 may decode the k calculated results remaining encrypted with the public key A1 by using the secret key A1 and then compute the total sum of the decoded k calculated results ($\Sigma_k$((CFP value of k company (TierN+1))×(Amount of use $u_k$ in TierN)). The certificate authority 3 may encrypt the total sum ($\Sigma_k$((CFP value of k company (TierN+1))×(Amount of use $u_k$ in TierN)) with the public key A2 and send the encrypted total sum to the server apparatus 1.

When the integrated result remaining encrypted with the public key A2 through the secure computation ("CFP value of TierN") is calculated, the information providing unit 114 sends, to the certificate authority 3, a request to convert the integrated result to a state encrypted with the public key A1 (hereinafter, which may be referred to as second conversion request).

In the certificate authority 3 having received the second conversion request, the integrated result remaining encrypted with the public key A2 ("CFP value of TierN") is decoded with the secret key A2. Furthermore, in the certificate authority 3, the decoded integrated result ("CFP value of TierN") is encrypted with the public key A1. The integrated result encrypted with the public key A1 ("CFP value of TierN") is sent from the certificate authority 3 to the server apparatus 1.

In the server apparatus 1 having received the integrated result encrypted with the public key A1 ("CFP value of TierN"), the information providing unit 114 stores the integrated result encrypted with the public key A1 ("CFP value of TierN") in a shared storage area of which access authority is given to both the company that manufactures the target product (TierN product) and a company that manufactures a downstream product (TierN−1 product) of the target product (TierN product).

The information providing unit 114 can obtain a final integrated result remaining encrypted with the public key A2 ("CFP value of Tier0 (the total amount of $CO_2$ emitted in a manufacturing activity from the most upstream product to the end product)" remaining encrypted with the public key A2) by sequentially repeating the above-described process from when the target product is a product downstream by one level from the most upstream product to when the target product is the end product (Tier0 product).

Flow of Process

Figure 18:
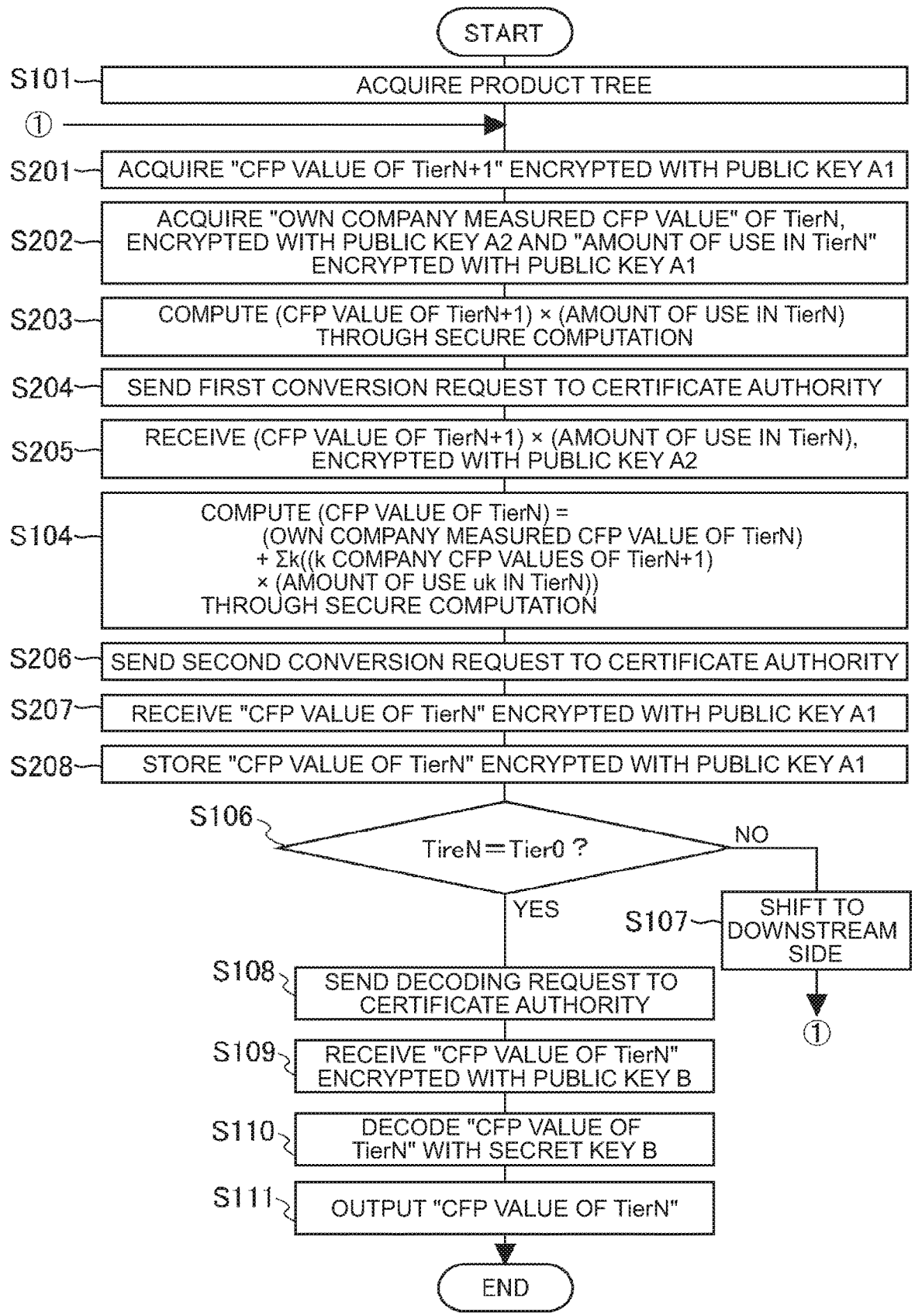
FIG. 18 is a flowchart that shows an example of the flow of a process executed by the server apparatus at the time of integrating traceability-related information according to a modification.

FIG. 18 is a flowchart that shows the flow of a process executed by the server apparatus 1 at the time of integrating traceability-related information according to the modification. In the flow of the process shown in FIG. 18, like step numbers are assigned to the same processes as those of the flow of the process shown in FIG. 17.

In the flow of the process shown in FIG. 18, the processes of step S201 to step S205 are executed instead of step S102 and step S103 of the flow of the process shown in FIG. 17, and the processes of step S206 to step S208 are executed instead of step S105 of the flow of the process shown in FIG. 17.

Initially, in step S201, the information providing unit 114 accesses a shared storage area of which access authority is given to both a company that manufactures a target product (TierN product) and a company that manufactures an inclusion product (TierN+1 product) of the target product (TierN product) and acquires the "CFP value of TierN+1" encrypted with the public key A1. However, when the inclusion product (TierN+1 product) is a most upstream product, the information providing unit 114 accesses the product information of the inclusion product (TierN+1 product) stored in the shared storage area or the dedicated storage area of the company that manufactures the inclusion product (TierN+1 product) and acquires the "own company measured CFP value" encrypted with the public key A1 as the "CFP value of TierN+1". When the information providing unit 114 finishes execution of the process of step S201, the information providing unit 114 executes the process of step S202.

In step S202, the information providing unit 114 accesses the product information of the target product (TierN product) stored in the dedicated storage area of the company that manufactures the target product (TierN product) and acquires the "own company measured CFP value" encrypted with the public key A2 and "the amount of use of upstream products (the amount of use in TierN)" encrypted with the public key A1. When the information providing unit 114 finishes execution of the process of step S202, the information providing unit 114 executes the process of step S203.

In step S203, the information providing unit 114 calculates the following calculation formula through secure computation by using the "CFP value of TierN+1" and "the amount of use in TierN", encrypted with the public key A1.

(CFP value of TierN+1)×(Amount of use in TierN)

The process of step S203 is executed for all the products (TierN+1 products) included in the target product (TierN product). In other words, when the number of inclusion products (TierN+1 products) of the target product (TierN product) is k, the process of step S203 is executed for each of the k inclusion products (TierN+1 products). When the information providing unit 114 finishes execution of the process of step S203, the information providing unit 114 executes the process of step S204.

In step S204, the information providing unit 114 sends, to the certificate authority 3, a request to convert the calculated result of step S203 to a state encrypted with the public key A2 (first conversion request). In the certificate authority 3 having received the first conversion request, the calculated result remaining encrypted with the public key A1 ((CFP value of TierN+1)×(Amount of use in TierN)) is decoded with the secret key A1 corresponding to the public key A1. Furthermore, in the certificate authority 3, the decoded calculated result ((CFP value of TierN+1)×(Amount of use in TierN)) is encrypted with the public key A2. The calculated result encrypted with the public key A2 (("CFP value of TierN+1")×(Amount of use in TierN)) is sent from the certificate authority 3 to the server apparatus 1.

When the calculated result encrypted with the public key A2 ((CFP value of TierN+1)×(Amount of use in TierN)) is sent from the certificate authority 3 to the server apparatus 1, the information providing unit 114 of the server apparatus 1 receives the information through the communication module 13 (step S205). When the information providing unit 114 finishes execution of the process of step S205, the management unit 115 executes the process of step S104.

In step S104, the information providing unit 114 calculates an integrated result remaining encrypted with the public key A2 ("CFP value of TierN" remaining encrypted with the public key A2) by computing the following calculation formula through secure computation by using the "own company measured CFP value" of TierN, encrypted with the public key A2, and the calculated result ((CFP value of TierN+1)×(Amount of use in TierN)).

$$(CFP \text{ value of Tier } N) = (\text{Own company measured } CFP \text{ value of Tier } N) + \sum_{k} ((CFP \text{ value of } k \text{ company (Tier } N + 1)) \times (\text{Amount of use } u_k \text{ in Tier } N))$$

When the information providing unit 114 finishes execution of the process of step S104, the information providing unit 114 executes the process of step S206.

In step S206, the information providing unit 114 sends, to the certificate authority 3, a request to convert the integrated result remaining encrypted with the public key A2 ("CFP value of TierN" remaining encrypted with the public key A2) to a state encrypted with the public key A1 (second conversion request). In the certificate authority 3 having received the second conversion request, the integrated result remaining encrypted with the public key A2 ("CFP value of TierN" remaining encrypted with the public key A2) is decoded with the secret key A2. Furthermore, in the certificate authority 3, the decoded integrated result ("CFP value of TierN") is encrypted with the public key A1. The integrated result encrypted with the public key A1 ("CFP value of TierN" encrypted with the public key A1) is sent from the certificate authority 3 to the server apparatus 1.

When the integrated result encrypted with the public key A1 ("CFP value of TierN") is sent from the certificate authority 3 to the server apparatus 1, the information providing unit 114 of the server apparatus 1 receives the information through the communication module 13 (step S207). When the information providing unit 114 finishes execution of the process of step S207, the information providing unit 114 executes the process of step S208.

In step S208, the information providing unit 114 stores the integrated result encrypted with the public key A1 ("CFP value of TierN" encrypted with the public key A1) in a shared storage area of which access authority is given to the company that manufactures the target product (TierN product) and a company that manufactures a downstream product (TierN−1 product) of the target product (TierN product). When the information providing unit 114 finishes execution of the process of step S208, the information providing unit 114 executes the processes of step S106 to step S111.

According to the modification, it is possible to integrate traceability-related information remaining encrypted, by using multiplication homomorphic secure computation and addition homomorphic secure computation. Thus, it is possible to reduce a calculation load on secure computation.

Other Embodiments

The above-described embodiment is only illustrative, and the disclosure can be implemented with modifications as needed without departing from the purport of the disclosure. For example, the configurations and processes described in this disclosure may be freely implemented in combination without any technical contradiction.

In the description of the embodiment, the server apparatus 1 stores product information in the database. Alternatively, product information may be stored in a device other than a database.

In the description of the embodiment, a mode in which a product tree is completed when the server apparatus 1 executes the first to fourth phases has been illustrated. Alternatively, a role of the server apparatus 1 may be distributed to the company terminals 2. For example, product information may be stored by a distributed database using a blockchain platform. In this case, a product information database may be made up of the company terminals 2. In this case, the above-described processes of the phases may be executed by using smart contract. For example, on condition that the account of a company writes permission information to a database, a process in the second phase may be executed. On condition that the account of a company writes an association request to the database, a process in the third phase may be executed.

In the description of the embodiment, a mode in which the server apparatus 1 executes information processing for integrating traceability-related information has been illustrated. Alternatively, the company terminal 2 of a company (OEM company) that manufactures an end product (Tier0 product) may execute information processing for integrating traceability-related information. Alternatively, information processing for integrating traceability-related information may be executed by the company terminals 2 in a distributed manner with a relay method of relaying from an upstream-side company terminal 2 to a downstream-side company terminal 2 in the product tree. The company terminal 2 of an OEM company that manufactures an end product (Tier0 product) may make a request of the certificate authority 3 to decode a final integrated result remaining encrypted.

In the description of the embodiment, a mode in which pieces of product information are stored in the storage unit 12 of the server apparatus 1 has been illustrated. Alternatively, pieces of information may be stored in the company terminals 2 in a distributed manner. In this case, a dedicated storage area may be disposed only in the company terminal 2 of a corresponding one of the companies. A shared storage area may be disposed in the company terminals 2 related to sharing in a distributed manner. In another example, meta data of product information (for example, information for identifying a product) may be held by the server apparatus 1, and product information of each company may be held by the company terminal 2 of the company.

Furthermore, in the description of the embodiment, an example in which an adjacent company in the supply chain is permitted to access selected product information has been described. Alternatively, companies not adjacent to each other in the supply chain may be configured to share product information. When, for example, information sharing between companies is needed for the purpose of legal compliance or the like, companies that are not directly dealing with each other may share specific product information. In this case as well, as in the case of the first embodiment, a shared storage area of which access authority is given to the companies is provided, and necessary data is copied. The shared storage area can be generated based on permission of the company of which the product information is referenced. A secret key may be used for access control to a dedicated storage area and a shared storage area. In this case, electronic authentication of access control may be performed by public key authentication infrastructure. When a blockchain platform is used for each storage area, the access control may be executed by smart contract.

In the description of the embodiment, the second phase is started when permission information is sent from the company terminal 2 of an upstream company to the server apparatus 1. Alternatively, the second phase may be started from the company terminal 2 of a downstream company. In this case, information to make a request to give access authority to an upstream product (permission request) may be sent from the company terminal 2 of a downstream company to the server apparatus 1, and the company terminal 2 of an upstream company may generate permission information accordingly. Furthermore, a permission request and association data may be sent at the same time from the company terminal 2 of a downstream company to the server apparatus 1. When a product that is a destination of association is allowed to be identified at a downstream company side (based on a product number or the like), association data can be sent from the downstream company side in advance of giving access authority.

Setting access authority for a storage area may be implemented by the operating system of the server apparatus 1 or may be implemented by another authentication method. For example, a public key encryption method or the like may be used. When the system is implemented by using a blockchain platform, access authority may be given by an electronic key.

In the description of the embodiment, the phase in which the server apparatus 1 receives product information on an upstream product and the phase in which the server apparatus 1 receives permission information corresponding to the product information have been described separately; however, both may be received at the same time. Similarly, in the description of the embodiment, the phase in which the server apparatus 1 receives product information on a downstream product and the phase in which the server apparatus 1 receives an association request corresponding to the product information have been described separately; however, both may be received at the same time.

In the above-described embodiment, a plurality of companies included in a supply chain has been described as companies that manufacture products. However, companies included in a supply chain do not necessarily need to be companies that manufacture products. For example, companies that perform transport, import, storage, wholesale, and the like of products may be included in companies that make up a supply chain. In an example, some companies of a plurality of companies may be, for example, companies that do not execute a manufacturing process, such as a trading company, a distributing agent, and an import agent, or may receive products from a company at a level upstream by one (upstream company) and supply products to a company at a level downstream by one (downstream company).

In the above-described embodiments, a supply chain of products relevant to automobiles has been assumed, an OEM maker has been described as the most downstream company, and a company that supplies parts, materials, assemblies, and the like has been described as a supplier. However, companies that belong to a supply chain are not necessarily limited thereto. Companies in each phase may be determined as needed according to products and the like. Manufacturing activities performed in each company by the time an end product is obtained may be determined as needed according to embodiments and may, for example, include all the activities that can be performed by the time an end product is obtained, such as excavation, working, assembling, conveyance, and storage. A product is not limited to the one relevant to an automobile and may be selected as needed according to embodiments. In an example, the product may be a battery used other than an automobile.

In the above-described embodiment, access control of each company is implemented by providing a dedicated storage area and a shared storage area. However, a method of implementing access control is not limited to such an example. A selected method may be used for access control. In another example, in the above-described embodiment, the shared storage area provided between companies that share information may be omitted. In this case, a company that makes a request to provide information (first company) may issue a key indicating authority to write into its own dedicated storage area (browsing is not permitted) for a company to be requested (second company). The second company may write target data to the dedicated storage area of the first company by using a key issued for the first company. According to this mode, information sharing is possible even when no shared storage area is provided (a shared storage area may be provided as needed), so management of a storage area is easy.

In the description of the embodiment, a mode in which an upstream company gives a downstream company authority to access product information (second phase) and subsequently the downstream company makes a request of the server apparatus 1 to associate pieces of product information with each other (third phase) has been illustrated. However, these processes may be continuously executed based on a request from a downstream company.

In the description of the embodiment, it is assumed that an upstream company and a downstream company are different companies, that is, an upstream product and a downstream product are respectively manufactured by different companies. However, in the above-described embodiment, a most upstream company can be in a position of an upstream company, and a most downstream company can be in a position of a downstream company. Companies other than the most upstream company or the most downstream company can be in a position of both an upstream company and a downstream company. Therefore, in the second phase, the company terminal 2 of each company may set its own company (target company) for an upstream company and send a permission command including designation of its own downstream company for permitting access to product information related to its own company's product, to the server apparatus 1. Own company's product is an example of a first target product of a target company, and product information related to the own company's product is an example of first product information related to the first target product. In response to this, the server apparatus 1 may execute setting of the access authority. In the third phase, the company terminal 2 of each company may send, to the server apparatus 1, an association request, including selection of product information, to associate pieces of product information related to the own company's product or a request to set a termination flag, among product information permitted to access its own company, serving as a downstream company, from an upstream company of the own company. The own company's product in this scene is an example of a second target product of a target company, and product information related to the own company's product is an example of second product information related to the second target product. In response to this, the server apparatus 1 may execute an association process or a termination flag process. The first target product (a target of access permission) and the second target product (a target of association or giving a termination flag) may be the same or different from each other. When the first target product and the second target product are the same, the first product information and the second product information may be the same. When the first target product and the second target product are different from each other, the first product information and the second product information may be different from each other.

In the above-described embodiment, the server apparatus 1 may execute computation of recycling rate and due diligence (score) in addition to or instead of calculation of the $CO_2$ emission amount (CFP value). The recycling rate may be calculated by calculating the following calculation formula through secure computation.

(Recycling rate of $TierN-1$ product for a target substance) =

{(Total amount of use in $TierN-1$) × (Recycling rate in $TierN-1$) +

$\Sigma_k$((Total amount of use of $k$ company $(TierN)$)) ×

(Recycling rate of $k$ company $(TierN)$) ×

(Amount of use $u_k$ in $TierN-1$))} ÷ {(Total amount of use in $TierN-1$) +

$\Sigma_k$((Total amount of use of $k$ company $(TierN)$)) ×

(Amount of use $u_k$ in $TierN-1$))} =

{(Recycled material usage amount in $TierN-1$) +

$\Sigma_k$((Recycled material usage amount of $k$ company $(TierN)$)) ×

(Amount of use $u_k$ in $TierN-1$))} ÷ {(Total amount of use in $TierN-1$) +

$\Sigma_k$((Total amount of use of $k$ company $(TierN)$)) ×

(Amount of use $u_k$ in $TierN-1$))}

A recycled material usage amount indicates the amount of use of a recycled material of a target substance. As in the case of CFP value, a recycling rate of an end product for a target substance can be calculated by sequentially calculating from the most upstream company (termination company). A due diligence score (DD score) can also be integrated by calculating similar computation to those of the CFP value and the recycling rate through secure computation. In an example, a DD score (integrated result) of an end product can be obtained by replacing the CFP value with a DD score and sequentially calculating from the most upstream company (termination company).

In the above-described embodiment, it is assumed that each company places an order with one company for a material. However, in the above-described embodiment, an order form of each company does not need to be limited to such an example. At least some of companies that belong to a supply chain may place an order with a plurality of upstream companies for the same product and selectively use the obtained upstream products for its own company's product. For example, in the example of FIG. 2, a product A11_1, a product A11_2, or a product A11_3 of Tier2 may be selectively used for the product A1 of Tier1. In this case, the server apparatus 1 may hold an association relationship for each pattern used. In the above example, the server apparatus 1 may hold association information for the product A1 of Tier1 like pattern 1 "product A11_1, . . . , of Tier2", pattern 2 "product A11_2, . . . ", and pattern 3 "product A11_3, . . . ". Accordingly, the server apparatus 1 may execute computation (integration) of the traceability-related information for each pattern. In this case, in an example, the server apparatus 1 may output a computation result for each pattern. In another example, the server apparatus 1 may calculate a statistic, such as a maximum value, a minimum value, a mean value, a variance, a standard deviation, and a median value, of computation results from the computation results and output the calculated static.

In the above-described embodiment, traceability-related information (particularly, CFP value) may be composed of primary data or may be composed of secondary data (inventory data). Primary data are actually measured values, and secondary data are reference values used when no actually measured value is obtained. In this case, computation (integration) of the traceability-related information may include calculating the ratio of primary data of traceability-related information obtained for an end product. The ratio of primary data may be calculated by simple ratio calculation or may be calculated by weighted calculation performed by replacing the CFP value with the ratio of primary data of each company in the calculation formula of the CFP value and sequentially calculating from the most upstream company.

A process described as the one that is performed by a device may be shared and performed by multiple devices. Alternatively, processes described as the ones that are respectively performed by different devices may be performed by a device. In a computer system, what hardware configuration (server configuration) implements functions may be flexibly changed.

The disclosure may also be implemented as follows. A computer is supplied with a computer program having the functions described in the above-described embodiment, and one or more processors of the computer read out and run the program. Such a computer program may be provided to a computer with a non-transitory computer-readable storage medium connectable to a system bus of the computer or may be provided to a computer via a network. Examples of the non-transitory computer-readable storage medium include a disk or disc of any type, such as a magnetic disk (floppy (registered trademark) disk, a hard disk drive (HDD), or the like), an optical disc (CD-ROM, DVD disc, a Blue-ray disc, or the like), a read only memory (ROM), a random access memory (RAM), an EPROM, an EEPROM, a magnetic card, a flash memory, an optical card, and a medium of any type suitable for storing electronic instructions.

What is claimed is:

1. An information processing apparatus comprising a control unit configured to execute:
   acquiring association information indicating an association relationship of products of companies included in a supply chain;
   acquiring product information of each of one or more inclusion products included in a target product based on the association information, the product information including traceability-related information of each of the one or more inclusion products, the traceability-related information being encrypted with a public key of a certificate authority;
   acquiring an encrypted integrated result of the traceability-related information by computing the encrypted traceability-related information through secure computation;
   sending, to the certificate authority, a request to decode the encrypted integrated result of the traceability-related information; and
   receiving, from the certificate authority, the decoded integrated result of the traceability-related information.

2. The information processing apparatus according to claim 1, wherein the decoded integrated result of the traceability-related information is sent from the certificate authority in an encrypted state that the control unit is allowed to decode.

3. The information processing apparatus according to claim 1, wherein:
the traceability-related information includes an amount of emission of greenhouse effect gas; and
the decoded integrated result of the traceability-related information includes a total amount of emission of greenhouse effect gas relevant to a production activity until the target product is manufactured.

4. The information processing apparatus according to claim 1, wherein:
the traceability-related information includes a recycling rate of a predetermined raw material; and
the decoded integrated result of the traceability-related information includes a comprehensive recycling rate of the predetermined raw material in the target product.

5. The information processing apparatus according to claim 1, wherein:
the traceability-related information includes a score for due diligence; and
the decoded integrated result of the traceability-related information includes a comprehensive score for due diligence in the target product.

6. The information processing apparatus according to claim 1, wherein:
the target product is a battery; and
the inclusion product is a product used in manufacturing the battery.

7. An information processing method executed by a computer, the information processing method comprising:
acquiring association information indicating an association relationship of products of companies included in a supply chain;
acquiring product information of each of one or more inclusion products included in a target product based on the association information, the product information including traceability-related information of each of the one or more inclusion products, the traceability-related information being encrypted with a public key of a certificate authority;
acquiring an encrypted integrated result of the traceability-related information by computing the encrypted traceability-related information through secure computation;
sending, to the certificate authority, a request to decode the encrypted integrated result of the traceability-related information; and
receiving, from the certificate authority, the decoded integrated result of the traceability-related information.

8. The information processing method according to claim 7, wherein the decoded integrated result of the traceability-related information is sent from the certificate authority in an encrypted state that the computer is allowed to decode.

9. The information processing method according to claim 7, wherein:
the traceability-related information includes an amount of emission of greenhouse effect gas; and
the decoded integrated result of the traceability-related information includes a total amount of emission of greenhouse effect gas relevant to a production activity until the target product is manufactured.

10. The information processing method according to claim 7, wherein:
the traceability-related information includes a recycling rate of a predetermined raw material; and
the decoded integrated result of the traceability-related information includes a comprehensive recycling rate of the predetermined raw material in the target product.

11. The information processing method according to claim 7, wherein:
the traceability-related information includes a score for due diligence; and
the decoded integrated result of the traceability-related information includes a comprehensive score for due diligence in the target product.

12. The information processing method according to claim 7, wherein:
the target product is a battery; and
the inclusion product is used in manufacturing the battery.

13. A non-transitory storage medium storing instructions that are executable on one or more processors and that cause the one or more processors to execute functions, the functions comprising:
acquiring association information indicating an association relationship of products of companies included in a supply chain;
acquiring product information of each of one or more inclusion products included in a target product based on the association information, the product information including traceability-related information of each of the one or more inclusion products, the traceability-related information being encrypted with a public key of a certificate authority;
acquiring an encrypted integrated result of the traceability-related information by computing the encrypted traceability-related information through secure computation;
sending, to the certificate authority, a request to decode the encrypted integrated result of the traceability-related information; and
receiving, from the certificate authority, the decoded integrated result of the traceability-related information.

14. The non-transitory storage medium according to claim 13, wherein the decoded integrated result of the traceability-related information is sent from the certificate authority in an encrypted state that the computer is allowed to decode.

15. The non-transitory storage medium according to claim 13, wherein:
the traceability-related information includes an amount of emission of greenhouse effect gas; and
the decoded integrated result of the traceability-related information includes a total amount of emission of greenhouse effect gas relevant to a production activity until the target product is manufactured.

16. The non-transitory storage medium according to claim 13, wherein:
the traceability-related information includes a recycling rate of a predetermined raw material; and
the decoded integrated result of the traceability-related information includes a comprehensive recycling rate of the predetermined raw material in the target product.

17. The non-transitory storage medium according to claim 13, wherein:
the traceability-related information includes a score for due diligence; and
the decoded integrated result of the traceability-related information includes a comprehensive score for due diligence in the target product.

18. The non-transitory storage medium according to claim 13, wherein:
the target product is a battery; and
the inclusion product is used in manufacturing the battery.

19. The information processing method according to claim 7, further comprising:
   sending the integrated result to a terminal corresponding to each of the companies; and
   showing the integrated result on a display provided for the terminal.

20. The non-transitory storage medium according to claim 13, the functions further comprising:
   sending the integrated result to a terminal corresponding to each of the companies; and
   showing the integrated result on a display provided for the terminal.

\* \* \* \* \*